US007600785B2

(12) United States Patent
Ramsey

(10) Patent No.: US 7,600,785 B2
(45) Date of Patent: Oct. 13, 2009

(54) FRAME FOR HEAVY-DUTY VEHICLES

(75) Inventor: John Edward Ramsey, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 11/687,292

(22) Filed: Mar. 16, 2007

(65) Prior Publication Data

US 2007/0216147 A1    Sep. 20, 2007

Related U.S. Application Data

(60) Provisional application No. 60/782,803, filed on Mar. 16, 2006.

(51) Int. Cl.
 *B62D 21/00* (2006.01)
(52) U.S. Cl. ..................................... 280/781
(58) Field of Classification Search .......... 280/124.109, 280/781, 789, 800; 296/187.03
See application file for complete search history.

(56) References Cited

U.S. PATENT DOCUMENTS

| | | | |
|---|---|---|---|
| 4,412,690 A | | 11/1983 | Prokop et al. |
| 4,929,008 A | | 5/1990 | Esfandiary |
| 5,088,763 A | * | 2/1992 | Galazin et al. ............... 280/656 |
| 5,203,585 A | | 4/1993 | Pierce |
| 5,335,932 A | * | 8/1994 | Pierce ......................... 280/788 |
| 5,720,489 A | | 2/1998 | Pierce et al. |
| 6,047,989 A | * | 4/2000 | Wood .......................... 280/789 |
| 6,073,947 A | | 6/2000 | Gottschalk et al. |
| 6,135,470 A | * | 10/2000 | Dudding .............. 280/124.128 |
| 6,425,593 B2 | | 7/2002 | Fabris et al. |
| 6,834,912 B2 | * | 12/2004 | Cardimen et al. ........... 296/204 |
| 7,198,298 B2 | | 4/2007 | Ramsey |
| 2006/0170205 A1 | | 8/2006 | Ramsey et al. |
| 2007/0126263 A1 | | 6/2007 | Ramsey et al. |

OTHER PUBLICATIONS

Images of prior art frame joints, images created by Applicant, and frame joints believed to be publicly available prior to Mar., 2005.

* cited by examiner

*Primary Examiner*—Paul N Dickson
*Assistant Examiner*—Robert A Coker
(74) *Attorney, Agent, or Firm*—Krugliak, Wilkins, Griffiths & Dougherty Co., L.P.A.; David P. Dureska; Edward T. Kennedy

(57) ABSTRACT

A frame for a heavy-duty vehicle includes a pair of spaced-apart and longitudinally-extending main members. At least two cross members extend between and are attached to the main members. Each one of at least a pair of hangers is attached to and depends from a respective one of the main members for suspending an axle/suspension system from the frame. A force distribution assembly is attached to the main members and the hangers and includes a component that deforms or shears in an extreme event. The force distribution assembly extends perpendicularly between the main members and interrupts the transmission of forces encountered by the axle/suspension system that move through each one of the hangers to its respective main member, and redirects at least a portion of such forces across said force distribution assembly and into the other one of the main members.

14 Claims, 19 Drawing Sheets

FRAME FOR HEAVY-DUTY VEHICLES

CROSS-REFERENCE TO RELATED APPLICATION

This application claims the benefit of U.S. Provisional Patent Application Ser. No. 60/782,803, which was filed on Mar. 16, 2006.

BACKGROUND OF THE INVENTION

1. Technical Field

The invention relates to heavy-duty vehicles, and in particular, to frames and subframes for heavy-duty vehicles. More particularly, the present invention is directed to frames and subframes for heavy-duty vehicles which include selected components that are bolted together in a manner that provides efficient distribution of forces, and include components for absorbing energy in an extreme event during vehicle operation.

2. Background Art

Heavy-duty vehicles that transport cargo, for example, tractor-trailers or semi-trailers, and straight trucks such as dump trucks, typically include leading or trailing arm suspension assemblies that connect the axles of the vehicle to the frame of the vehicle. In some heavy-duty vehicles, the suspension assemblies are connected directly to the primary frame of the vehicle. In other heavy-duty vehicles, the primary frame of the vehicle supports a subframe, and the suspension assemblies connect directly to the subframe. For those heavy-duty vehicles that support a subframe, the subframe can be non-movable or movable, the latter being commonly referred to as a slider box, slider subframe, slider undercarriage, or secondary slider frame. For the purpose of convenience and clarity, reference herein will be made to a slider box, with the understanding that such reference is by way of example, and that the present invention applies to heavy-duty vehicle primary frames, movable subframes and non-movable subframes.

In the heavy-duty vehicle art, one or more axle/suspension systems usually are suspended from a single slider box. It is understood that a slider box outfitted with usually two axle/suspension systems typically is referred to as a slider or slider tandem, and for purposes of convenience and clarity, will hereinafter be referred to as a slider tandem. Of course, a slider box may also be outfitted with a single axle/suspension system, or three or more axle/suspension systems. By way of example, reference herein shall be made to a slider tandem having a pair of axle/suspension systems mounted thereon, with the understanding that such reference also applies to a slider outfitted with one, three or more axle/suspension systems. The slider tandem in turn is mounted on the underside of the trailer primary frame, and is movable longitudinally therealong to provide a means for variable load distribution and vehicular maneuverability.

More specifically, the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. A trailer having a slider tandem gains an advantage with respect to laws governing maximum axle loads. More particularly, proper placement of the slider tandem varies individual axle loads or redistributes the trailer load so that it is within legal limits A slider box typically includes a pair of longitudinally extending elongated main members or rails that are parallel to one another. The parallel spacing between the main members is maintained by cross members, which extend transversely between and are connected to the main members The main members and the cross members of prior art slider boxes are usually made of steel, which enables the cross members to be butted against and welded to the inboard surface of the main members. Other components that are part of or are related to the slider box, such as reinforcing members and suspension assembly hangers, typically are also made from steel and are welded to the main members and/or the cross members. The slider box typically is movably attached to the vehicle primary frame by a retractable pin mechanism.

One consideration in the design of any slider box is weight. More particularly, for at least two reasons it is desirable to reduce the weight of a slider box as much as possible, while still maintaining performance characteristics and robustness. First, such a weight reduction decreases the amount of fuel that the heavy-duty vehicle consumes, leading to a corresponding reduction in fuel costs. Second, local, state and/or national road and bridge laws typically set a maximum weight limit for a trailer load, which includes the weight of the trailer and the payload carried on or in the trailer. If the weight of the slider box is reduced, more vehicle weight capacity can be devoted to the payload, enabling a larger payload to be transported and increasing the overall profitability of the vehicle.

To reduce the weight of the slider box, the use of structural materials that are lighter than steel, such as aluminum and aluminum alloys for the main members, cross members, and other components has often been explored in the prior art. However, certain characteristics of aluminum, such as high thermal conductivity and a low melting point, make the welding of aluminum components different, and potentially more difficult, than the welding of steel components. In addition, aluminum components that are welded together may exhibit fatigue at the weld area, thereby potentially creating a weaker connection when compared to steel components that are welded together.

The potential for a weaker connection may become a concern at the interface between the main members and the hangers, and potentially at any interface between the cross members and the hangers. Since the axle/suspension system typically pivotally connects to the hangers, which are welded to the main members, the interface between the hangers and the main members is instrumental in reacting the vertical, fore-aft, side and torsional loads encountered by the axle/suspension system. More particularly, loads or forces acting on the axle/suspension system, such as brake loads, fore-aft loads, side loads, curbing loads, vertical loads and torsional loads, tend to cause the hanger to rock or move fore-to-aft and side-to-side. Such movement of the hanger highly stresses the rigid attachment of the hanger to the main member and potentially any rigid attachment of the hanger to the cross member, which may cause a potentially less-than-optimal weld to fail. Thus, the use of aluminum components, which may not facilitate a welded connection that is as strong as a weld between steel components, may undesirably fail.

To overcome the concern of a potential failure of a welded connection between aluminum components, the components may instead be bolted together. The use of a bolted connection provides strength, enables compliance, and reduces stress risers. However, in the prior art, it has been difficult to attach the hanger to the main member and/or cross member using bolts in a manner which enables adequate distribution among the bolts of the different loading forces that act on the axle/ suspension system and thereby achieve a satisfactory fatigue life of the slider box components Moreover, another consideration in the design of any slider box is the ability of the slider box to withstand extreme events. That is, the slider box and the axle/suspension system of a heavy-duty vehicle must also be durable enough to withstand the force created by events such as single-wheel impacts caused by a wheel striking a bump in a road, a large pot-hole, or highway guard rails. Such extreme events also include the static hang-up of a wheel in service, which is a low-speed event in which a tire is hung up or stopped temporarily during service until the vehicle pulls through the event. When a vehicle encounters an extreme event, a vertical crush force is produced which potentially can cause significant damage to the slider box. More specifically, in a typical prior art slider tandem, when a vertical crush force is produced, a force in the aft direction is produced wherein the beam of a trailing beam suspension pulls toward the rear of the vehicle, in turn causing the rear portion of the hanger to which it is pivotally attached to impact or move vertically upward into the main member and/or cross member with significant force.

This vertical crush force may be of differing magnitudes at different points throughout the suspension system, depending on the nature of the impact. For example, a static hang-up of a wheel in service is likely to produce a greater force than simply striking a bump in the road. A side force may also be produced if the impact is on a single wheel, which would cause the beam to pull back and sideways, causing the hanger to twist. These impacts could damage, or in an extreme case, cause a slider box main member and/or one or more of the attached cross members to fail, in either instance eventually requiring replacement, which is costly and time-consuming. Although the hanger typically is not damaged from such impacts, it usually also is replaced along with the main member and/or cross member. This design of a typical slider tandem causes many heavy-duty vehicles containing such slider tandems to be out of service for extended periods of time after such extreme events until the entire slider box can be replaced.

These potential concerns have created a need in the art for lighter weight heavy-duty vehicle primary frames and subframes that include selected components which are joined in a stronger and more dependable manner than by welding nonferrous materials, which are capable of efficient distribution of forces, and which reduce potential damage from extreme events.

SUMMARY OF THE INVENTION

One objective of the present invention is to provide heavy-duty vehicle primary frames and subframes that are lighter in weight than prior art subframes having steel components, with connections between selected components that are stronger than connections established by welding the components.

Another objective of the present invention is to provide heavy-duty vehicle primary frames and subframes that efficiently distribute loading forces.

Yet another objective of the present invention is to provide heavy-duty vehicle primary frames and subframes that reduce potential damage from extreme events These objectives and advantages are obtained by the frame for heavy-duty vehicles of the present invention. In an exemplary embodiment of the invention, the frame includes a pair of spaced-apart, parallel, elongated and longitudinally extending main members At least two cross members extend between and are attached to the main members Each one of at least a pair of hangers is attached to a respective one of the main members for suspending an axle/suspension system from the frame. A force distribution assembly is attached to the main members and to the hangers. The force distribution assembly extends perpendicularly between the main members and interrupts the transmission of forces encountered by the axle/suspension system that move through each one of the hangers and into its respective main member, and redirects at least a portion of the forces across the force distribution assembly and into the other one of the main members

BRIEF DESCRIPTION OF THE DRAWINGS

The preferred embodiments of the present invention, illustrative of the best mode in which applicant has contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENTS

Figure 1:
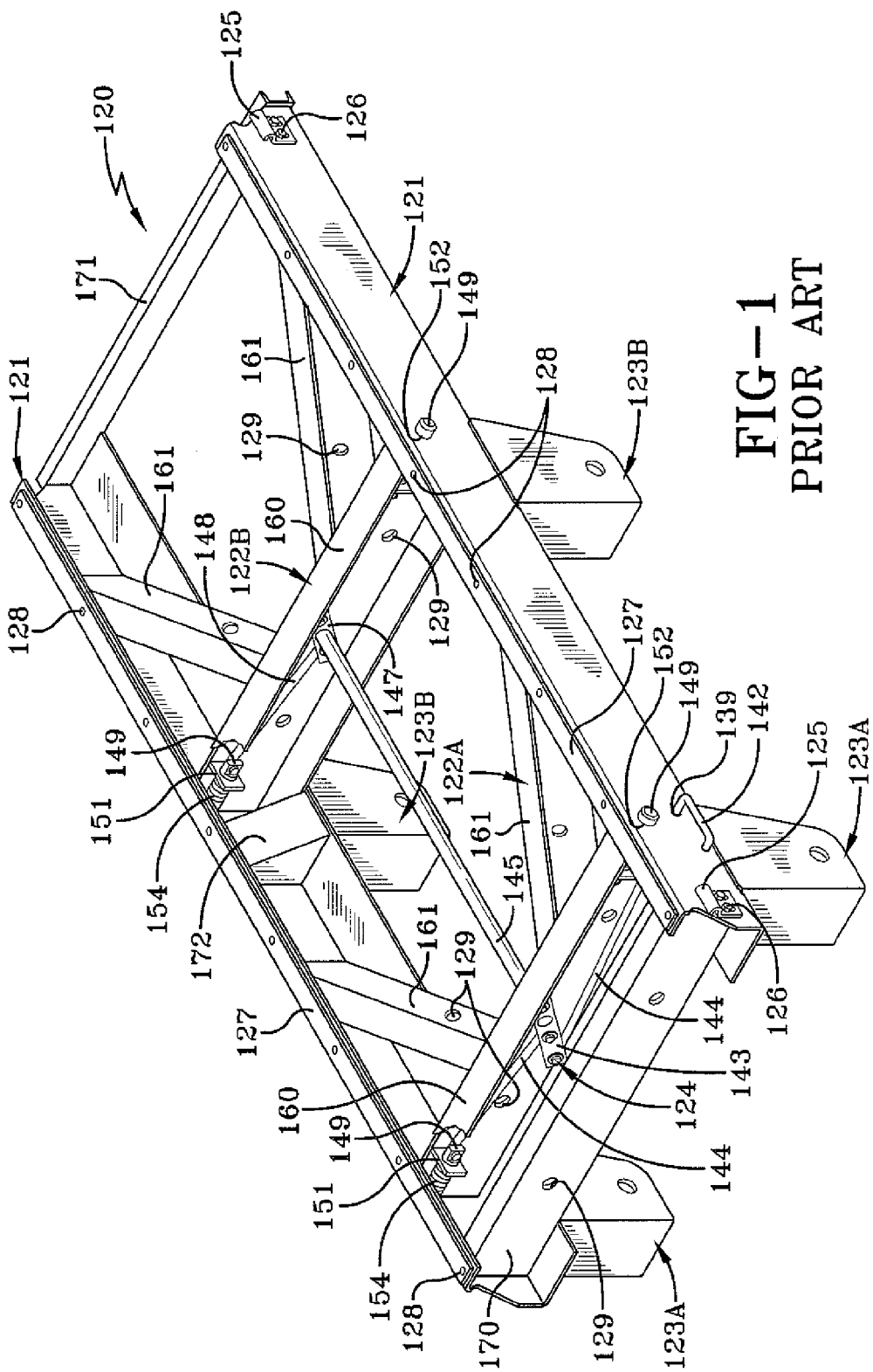
FIG. 1 is a top front perspective view of a prior art steel slider box for a tractor-trailer, showing a pin mechanism for movably attaching the slider box to the primary frame of the vehicle and depending hangers for suspending axle/suspension systems from the slider box.

As mentioned above, for the purposes of clarity and convenience, reference herein is made to a slider box, with the understanding that such reference is by way of example, and the present invention applies to heavy-duty vehicle primary frames, movable subframes and non-movable subframes. In order to better understand the slider box of the present invention, a prior art slider box for a tractor-trailer is shown in FIG. 1, is indicated generally at 120, and now will be described. Slider box 120 includes a pair of main members 121 and front and rear generally K-shaped cross member structures 122A and 122B, respectively. Front and rear pairs of hangers 123A and 123B, respectively, are attached to respective ones of main members 121 for suspending axle/suspension systems. A retractable pin mechanism 124 is incorporated into slider box 120 for selective positioning of the slider box beneath the vehicle primary frame, as will be described in greater detail below. Reference to slider box 120 includes styles of slider boxes known in the art other than K-frame type slider boxes, such as perpendicular-frame or ladder-type slider boxes, and slider boxes suspending other types of suspension assemblies than those described and shown herein, such as spring suspensions. For the sake of clarity and consistency, reference hereinbelow will be made to slider box 120 with the understanding that such reference generally includes all types of slider boxes known to those skilled in the art.

With continuing reference to FIG. 1, each main member 121 is a longitudinally-extending, elongated, generally C-shaped beam made of steel. The open portion of each main member 121 is opposed to the open portion of the other main member and faces inboard relative to slider box 120. Main members 121 are connected to each other in a spaced-apart parallel relationship by K-shaped cross member structures 122A, B.

Each K-shaped cross member structure 122 includes a base member 160 which extends between and is perpendicular to main members 121. Each base member 160 is a generally C-shaped beam made of steel. The open portion of each base member 160 faces in a frontward direction. Each end of base member 160 nests in and abuts the inboard open portion of a respective one of main members 121, and is secured therein by welding. Each front hanger 123A abuts and is attached by welding to the lowermost surface of a respective one of main members 121 at a location directly beneath base member 160 of front K-shaped cross member structure 122A. Each rear hanger 123B similarly is attached at a location directly beneath base member 160 of rear K-shaped cross member structure 122B Each K-shaped cross member structure 122 further includes a pair of inclined, diagonal or angled members 161, each of which is a generally C-shaped beam also made of steel. The open portion of each angled member 161 faces in an outboard-frontward direction, and each of the angled members extends between generally the middle portion of base member 160 and a respective one of main members 121. The front end of each angled member 161 abuts and is attached to the rearwardmost surface of base member 160 at an angle by welding, and the rear end of each of the angled members is nested in and abuts at an angle the open portion of a respective one of main members 121, and also is attached thereto by welding Thus, it can be seen that base member 160 and angled members 161 form an integral K-shaped cross member structure 122 which interconnects and maintains main members 121 in a spaced-apart parallel relationship.

A reinforcing cross member 170 is disposed frontwardly of retractable pin mechanism 124, and extends between and is perpendicular to main members 121 Reinforcing cross member 170 is a generally C-shaped beam made of steel, the open portion of which faces in a rearward direction. Each end of reinforcing member 170 nests in and abuts the open portion of a respective one of main members 121, and is secured therein by welding. An optional reinforcement bar 171, which extends between the rearwardmost ends of main members 121, adds additional strength to the structure, and is attached thereto by welding.

One or more openings 129 are formed in the vertically extending surface of front reinforcing cross member 170, each base member 160 and each angled member 161, and each of the openings 129 is aligned with the corresponding openings formed in the other members to provide for passage of air and/or fluid conduits, electrical lines, and the like used in the operation of the tractor-trailer (not shown).

Figure 2:
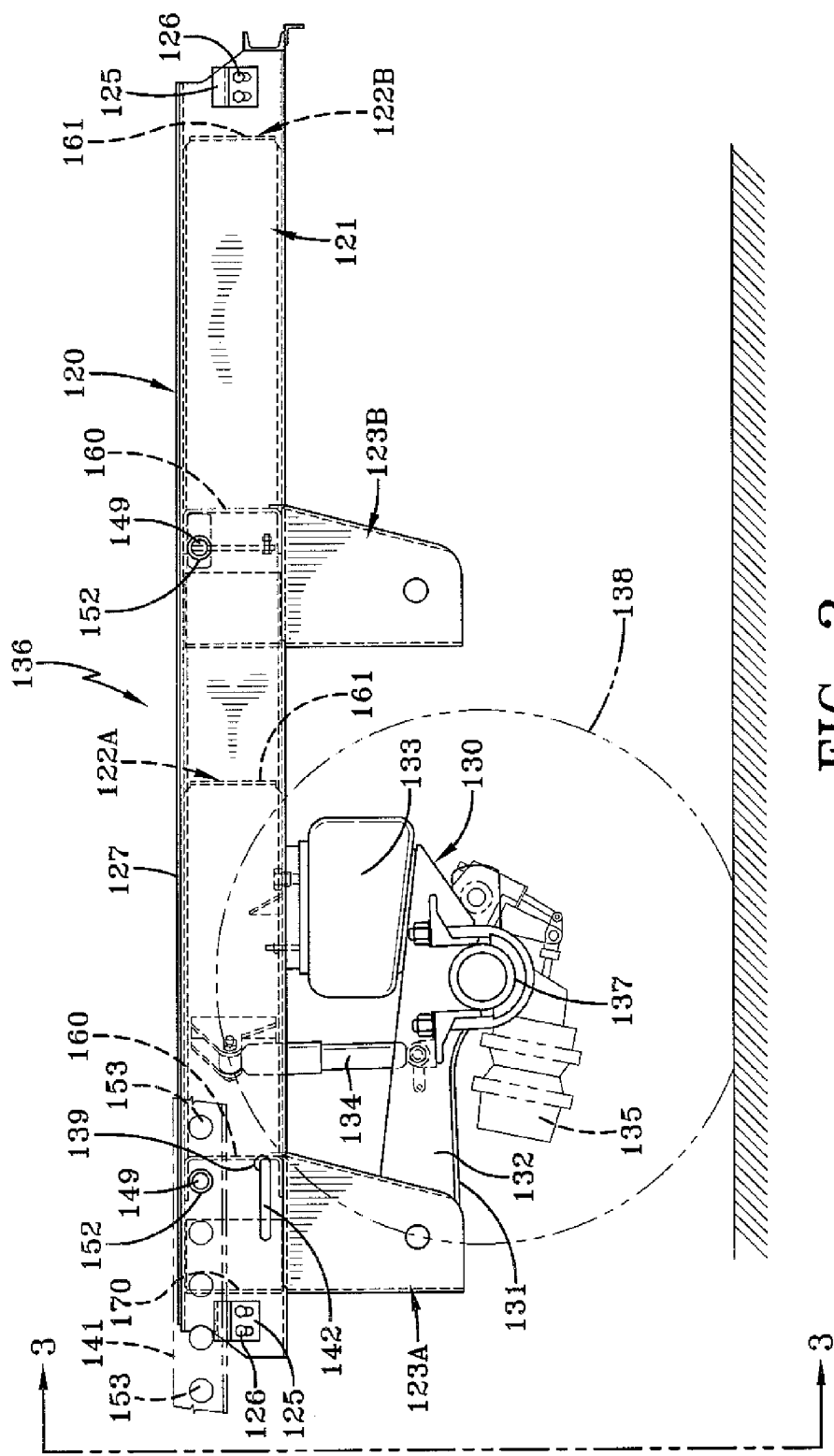
FIG. 2 is an enlarged fragmentary elevational view of a prior art slider tandem, including the prior art slider box shown in FIG. 1, showing one of two axle/suspension systems mounted on the slider box, and the slider tandem slidably mounted on one of a pair of rails that depend from the vehicle primary frame, with portions thereof represented by broken lines.

Each main member 121 has a pair of rail guides 125 mounted on its outboard surface by bolts 126. Each rail guide 125 is mounted adjacent to a respective one of the ends of main member 121. A low friction strip 127 is attached to the uppermost surface of each main member 121 by recessed fasteners 128, and extends generally the entire length of main member 121 Strip 127 is formed of any suitable low friction material, such as ultra-high molecular weight polyethylene As mentioned hereinabove, and as best shown in FIG. 2, prior art slider box 120 supports front and rear axle/suspension systems, forming a slider tandem 136 However, only front axle/suspension system 130 is shown in the drawings and described herein since the front and rear systems are identical in structure and operation. Moreover, inasmuch as axle/suspension system 130 is suspended from slider box 120, but does not form an integral part thereof, only the major components of the system will be cited for aiding in the description of the environment in which the prior art slider box operates.

Axle/suspension system 130 includes generally identical suspension assemblies 131 suspended from each hanger 123A of the pair of front hangers. Each suspension assembly 131 includes a suspension beam 132 which is pivotally mounted on hanger 123A in a usual manner. An air spring 133 is suitably mounted on and extends between the upper surface of the rearwardmost end of suspension beam 132 and main member 121 at a location directly beneath the outboard end of a respective one of angled members 161 of K-shaped cross member structure 122A. A shock absorber 134 extends between and is mounted on suspension beam 132 and the respective angled member 161. Another component of suspension assembly 131, mentioned herein only for the sake of relative completeness, is an air brake 135. An axle 137 extends between and is captured in the pair of suspension beams 132 of axle/suspension system 130. One or more wheels 138 are mounted on each end of axle 137. A reinforcement member 172 (FIG. 1) is mounted by any suitable means in the open portion of each main member 121 frontwardly of and adjacent to each end of rearward base member 160 and directly above rearward hanger 123B, to provide additional strength to slider box 120 for supporting the rearward hanger and its associated suspension assembly.

Slider tandem 136 is movably mounted on trailer body 140 (FIG. 3) by slidable engagement of rail guides 125 with elongated, longitudinally-extending, spaced-apart, parallel, and generally Z-shaped rails 141, which are mounted on and depend from the underside of the trailer body. Each low friction strip 127 abuts the bottom surface of the uppermost portion of a respective one of rails 141 to provide a smooth, generally friction-free contact surface for slidable movement of slider tandem 136 on trailer body 140.

Figure 3:
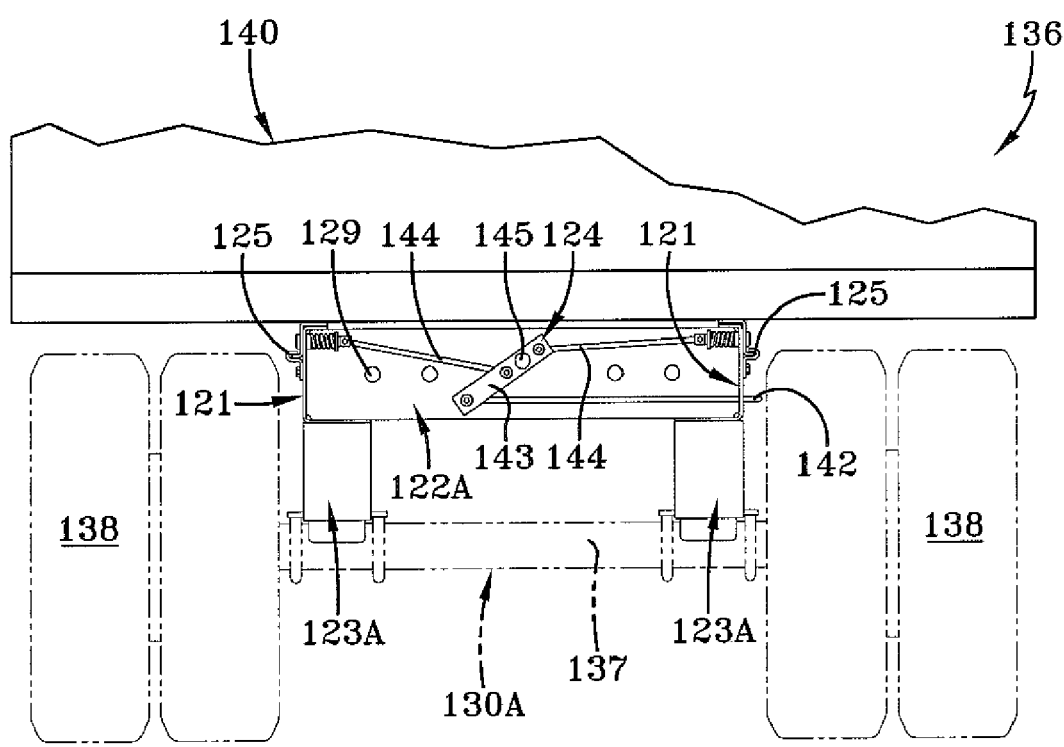
FIG. 3 is a reduced-size fragmentary view looking in the direction of lines 3-3 of FIG. 2, with portions thereof represented by broken lines, and showing the prior art slider tandem of FIG. 2 movably mounted on the underside of a trailer body, with the front reinforcing cross member of the slider box of the slider tandem removed.

Slider tandem 136 can be selectively positioned relative to trailer body 140 for optimum load distribution by retractable pin mechanism 124. As best shown in FIGS. 1 and 3, pin mechanism 124 includes a generally L-shaped handle 142 which passes through an opening 139 formed in a selected one of main members 121, but usually on the driver's side of the tractor-trailer. It can be seen that the bent end portion of handle 142, which extends outwardly from the outboard side of main member 121, is accessible for easy grasping by an operator of the tractor-trailer. The inboard end of handle 142 is pivotally attached to a lever 143, which in turn is pivotally attached to a pair of arms 144 which extend in opposite outboard directions from lever 143. Level 143 further is attached to an elongated pivot rod 145 which passes rearwardly through an opening (not shown) formed in base member 160 of front K-shaped cross member structure 122A. The end of pivot rod 145 remote from lever 143 similarly is attached to a remote lever 147, which in turn is pivotally attached to a pair of arms 148 which extend in opposite outboard directions from lever 147. The outboard end of each of arms 144, 148 is bent and is pivotally attached to the inboard end of a pin 149.

With reference now to FIGS. 1 and 2, the inboard end of each pin 149 is slidably mounted in an opening (not shown) formed in a bracket 151 which is attached by suitable means such as welding to a respective one of base members 160. The enlarged outboard end of each pin 149 passes through a generally round or circular-shaped opening 152 formed in a respective one of main members 121. When it is desired to lock slider tandem 136 in a selected position relative to trailer body 140 (FIG. 3), the slider box main member openings 152 are aligned with selected ones of a plurality of correspondingly-sized and shaped openings 153 formed in rails 141 of the trailer body (FIG. 2). Each pin 149 automatically extends through the selected aligned openings 152, 153 since the pin is biased in an outboard direction by a coil spring 154 captured between bracket 151 and the enlarged outboard end of pin 149. When it is again desired by the operator of the tractor-trailer to move slider tandem 136 beneath trailer body 140, the parking brake of the trailer is engaged, handle 142 is pulled in an outboard direction and against the bias of coil springs 154 to retract pins 149 out of trailer rail openings 153, and slider tandem 136 is moved longitudinally along trailer rails 141 until slider box main member openings 152 align with selected trailer rail openings 153 and pins 149 engage therewith as described hereinabove for maximizing load distribution.

Although the described prior art steel slider box 120 satisfactorily performs its intended function, in an attempt to desirably reduce the weight of slider box 120, the use of structural materials that are lighter than steel for components such as main members 121, cross member structures 122, hangers 123 and reinforcing cross member 170 has been explored. Such materials include aluminum and aluminum alloys, as well as other non-ferrous metals and alloys, and composite materials.

However, characteristics of these materials make the typical prior art joining of components via welding, such as described above, undesirable. For example, the high thermal conductivity and low melting point associated with aluminum and aluminum alloys make the welding of aluminum components different, and potentially more difficult, than the welding of components made from steel. In addition, components made from aluminum or aluminum alloys that are welded together may exhibit fatigue at the weld area, thereby potentially creating a weaker connection when compared to components made from steel that are welded together, which is of particular concern at the highly-stressed connection between hangers 123 and main members 121. Moreover, prior art slider box 120 may be susceptible to damage from forces created by extreme events, such as single-wheel impacts and static hang-up of a wheel in service.

Such potential concerns with the prior art process of welding, as applied to generally lighter weight non-ferrous metals and other materials, have created a need in the art for heavy-duty vehicle primary frames and subframes that include selected components which are joined in a stronger and more dependable manner than by welding, that provide efficient distribution of forces, and that reduce potential damage from extreme events. The present invention provides such heavy-duty vehicle primary frames and subframes.

Figure 4:
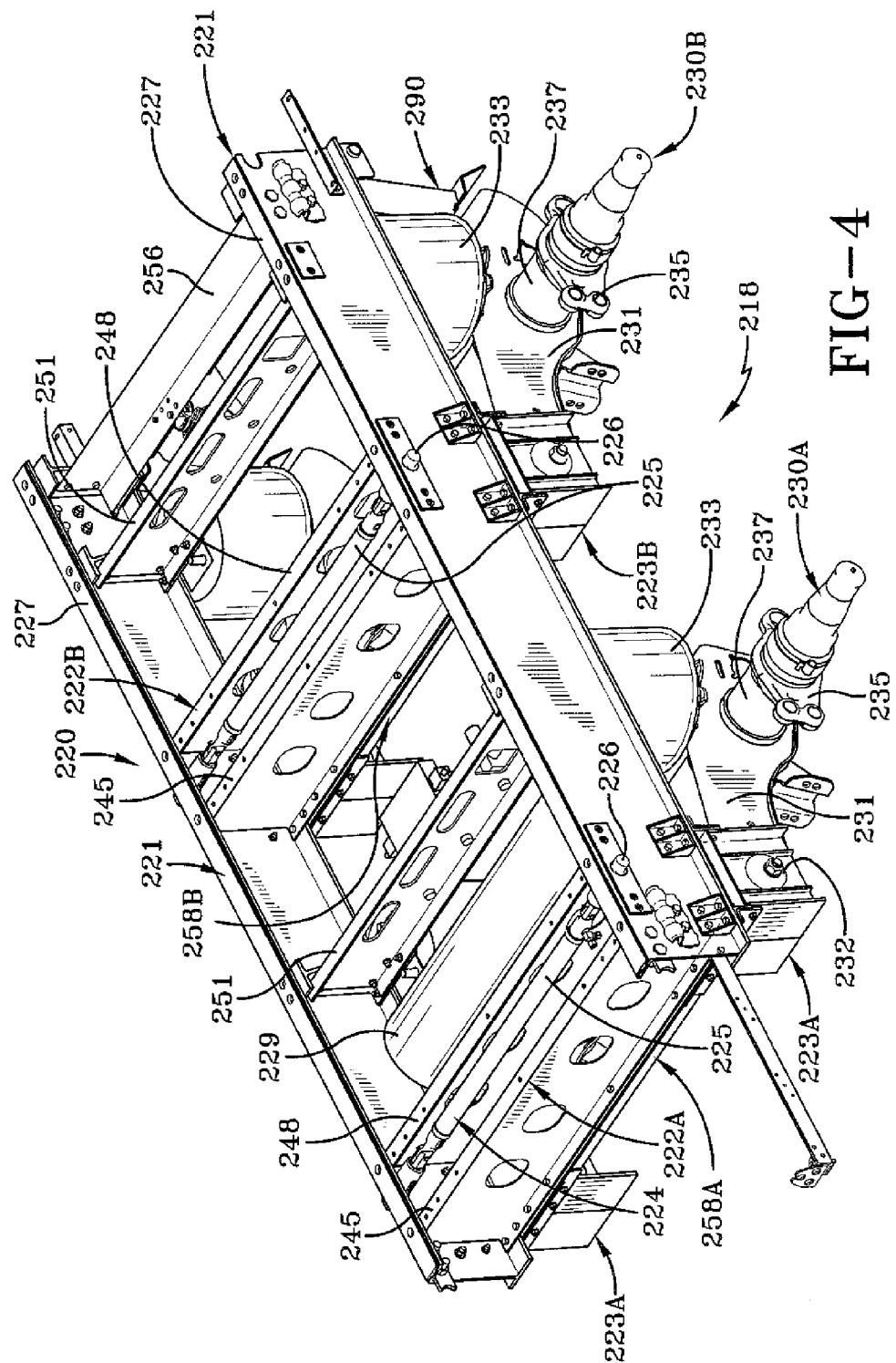
FIG. 4 is a top perspective view of a slider tandem, including a first embodiment slider box for a tractor-trailer of the present invention, showing a portion of a pin mechanism for movably attaching the slider box to the primary frame of the vehicle, force distribution assemblies, depending hangers, and two axle/suspension systems mounted on the slider box.

Turning now to the drawings of the present invention, wherein the illustrations are for showing preferred embodiments of the invention, and not for limiting the same, FIG. 4 shows a slider tandem 218 including a first embodiment slider box of the present invention, indicated generally at 220. First embodiment slider box 220 includes a pair of longitudinally extending, spaced-apart parallel main members 221, and transversely extending, spaced-apart parallel front and rear cross member sets 222A and 222B, which extend between and interconnect the main members. First embodiment slider box 220 includes a front force distribution assembly 258A generally disposed under main members 221 and over front hangers 223A, and which preferably extends transversely to the outboard edges of the main members, as will be described in greater detail below A rear force distribution assembly 258B similarly is generally disposed under main members 221 and over rear hangers 223B, and preferably extends transversely to the outboard edges of the main members.

Slider box 220 accommodates a retractable pin mechanism 224, which preferably is a pneumatically actuated mechanism including an air bladder 225 and retractable pins 226, as more fully described in U.S. Pat. No. 6,279,933, issued on Aug. 28, 2001 and owned by the same assignee as the present invention, Hendrickson USA, L.L.C. Alternatively, pin mechanism 224 may be any mechanically or pneumatically actuated mechanism known to those skilled in the art, including a mechanism similar to that as described above for prior art slider box 120. An air tank 229 optionally extends between slider box main members 221 for convenient storage of compressed air.

A low friction strip 227, which is formed of any suitable low friction material, such as ultra-high molecular weight polyethylene, is attached to the uppermost surface of each main member 221 and extends generally the entire length of the main member. More particularly, main member 221 preferably is formed with a channel 228 (FIG. 11) to retain low friction strip 227. In the prior art, as shown in FIG. 1, low friction strip 127 is bolted to a main member 121 via bolts or fasteners 128. Since low friction strip 127 typically is made of a polymer, its rate of thermal expansion is different from that of a metal main member 121. Over time, low friction strip 127 may bulge between bolts 128, which may cause portions of the strip to break off, creating an unsupported area for the movement of slider box 120. Having such an unsupported area may contribute to cracking of certain components of slider box 120. In addition, the use of bolts 128 to secure strip 127 may result in a less-than-flush installation of some bolts, or a backing out of the bolts, which may undesirably cause slider box 120 to jam. In contrast, low friction strip 227 interlocks with channel 228 to secure the strip without the use of bolts 128, or reduces the number of bolts, which allows the strip to thermally expand at a different rate from that of main member 221 without bulging or breaking. In this manner, channel 228 reduces or eliminates the problems of the prior art, and also reduces or eliminates the cost and weight of the bolts.

Figure 5:
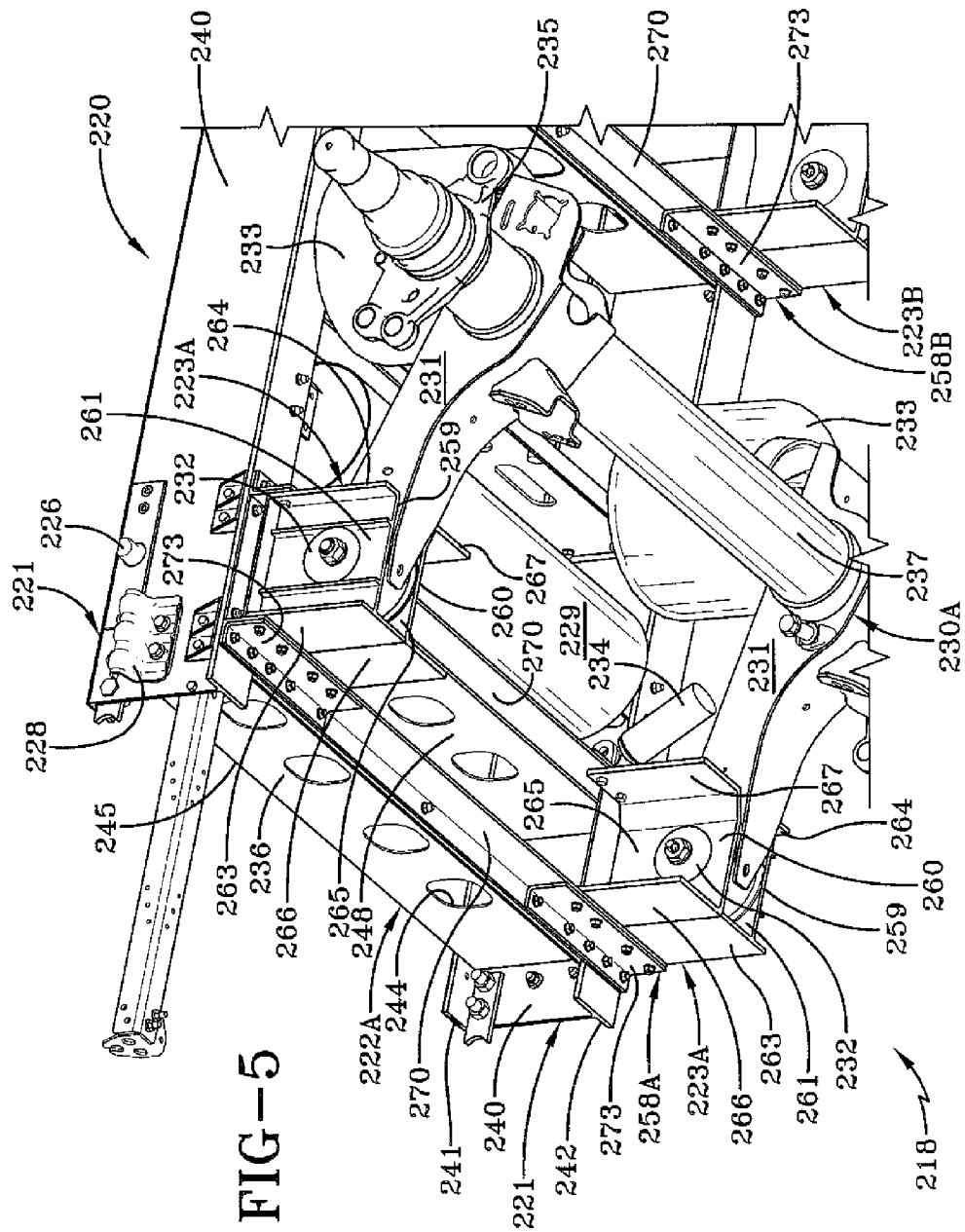
FIG. 5 is an enlarged bottom perspective view of a front portion of the slider tandem shown in FIG. 4.
Figure 6:
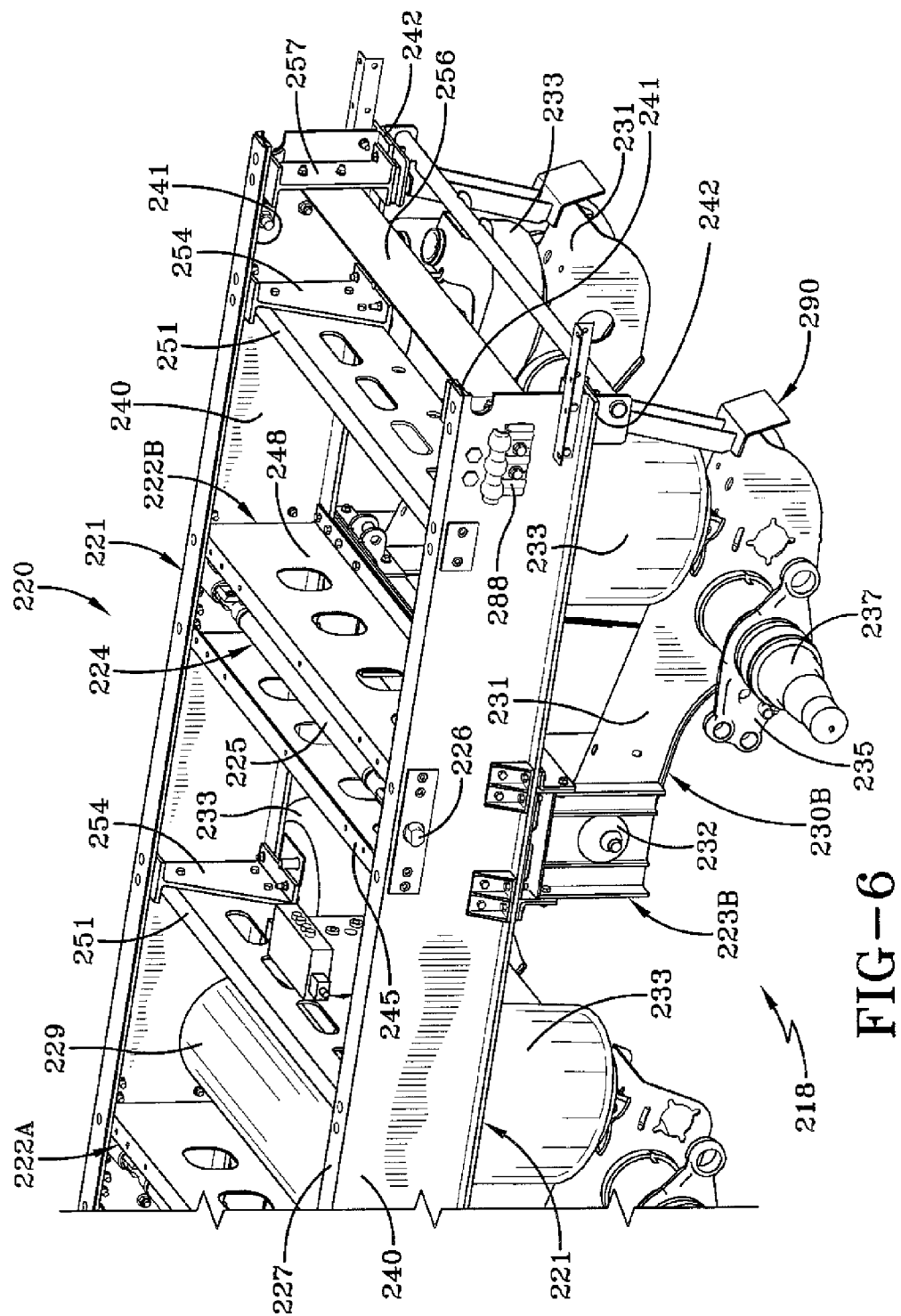
FIG. 6 is an enlarged top perspective view of a rear portion of the slider tandem shown in FIG. 4.

With additional reference to FIGS. 5 and 6, first embodiment slider box 220 supports front and rear axle/suspension systems 230A,B, forming slider tandem 218 Inasmuch as axle/suspension systems 230A,B are suspended from slider box 220, but do not form an integral part thereof, only the major components of the system will be cited for aiding in the description of the environment in which the slider box operates. Each axle/suspension system 230A,B includes a suspension beam 231 which is pivotally mounted on each respective hanger 223A,B in a usual manner via a bushing assembly 232. An air spring 233 is suitably mounted on and extends between the upper surface of the rearwardmost end of suspension beam 231 and main member 221 at a location directly beneath a rear cross member 251 of each cross member set 222A,B. A shock absorber 234 extends between and is mounted on suspension beam 231 and force distribution assembly 258A,B, as will be described in greater detail below. Components of brake system 235 are shown for the sake of relative completeness, and an axle 237 extends between and is captured in the pair of suspension beams 231.

Figure 7:
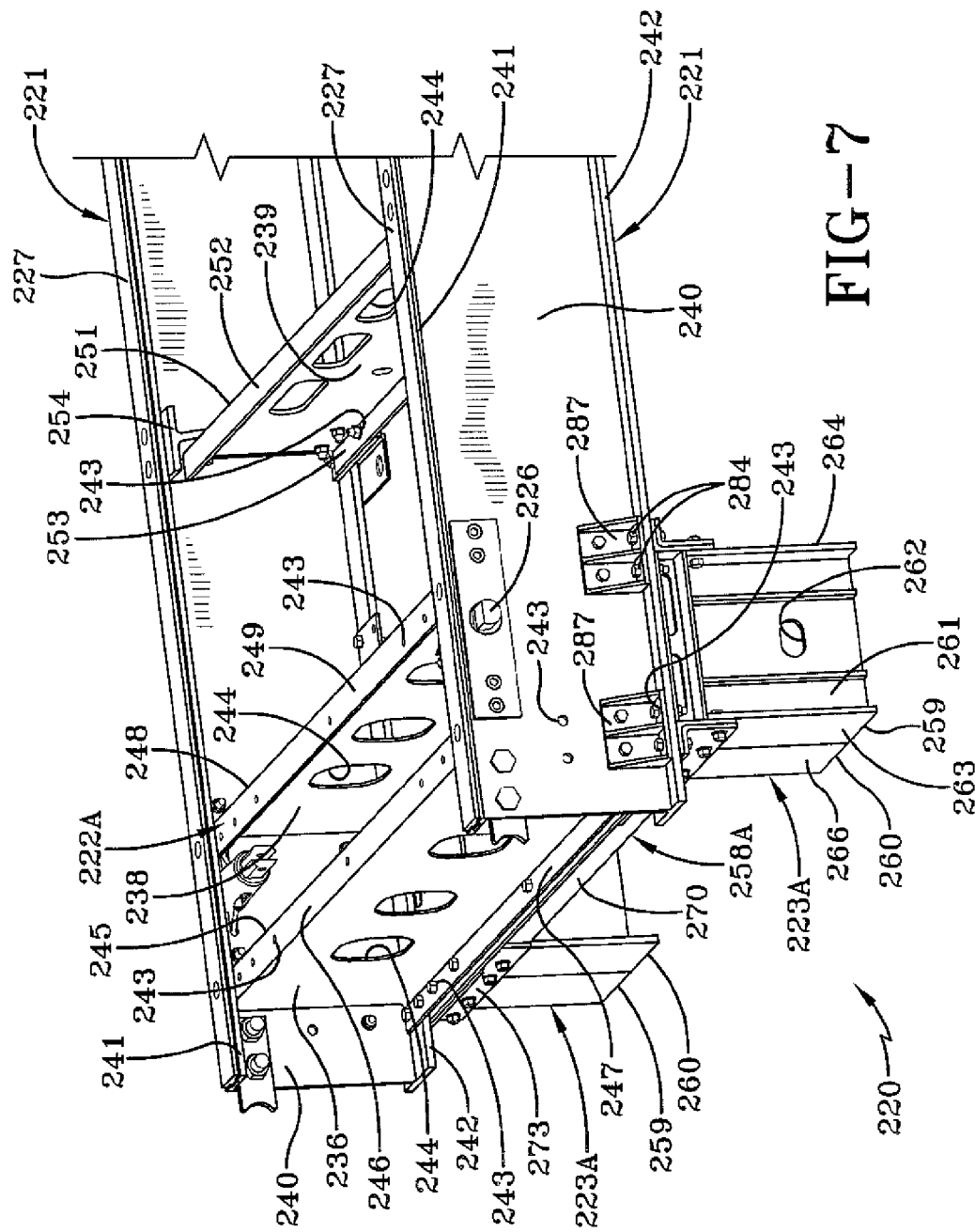
FIG. 7 is a greatly enlarged side perspective view of a front portion of the slider box, front force distribution assembly and depending front hangers shown in FIG. 4.
Figure 8:
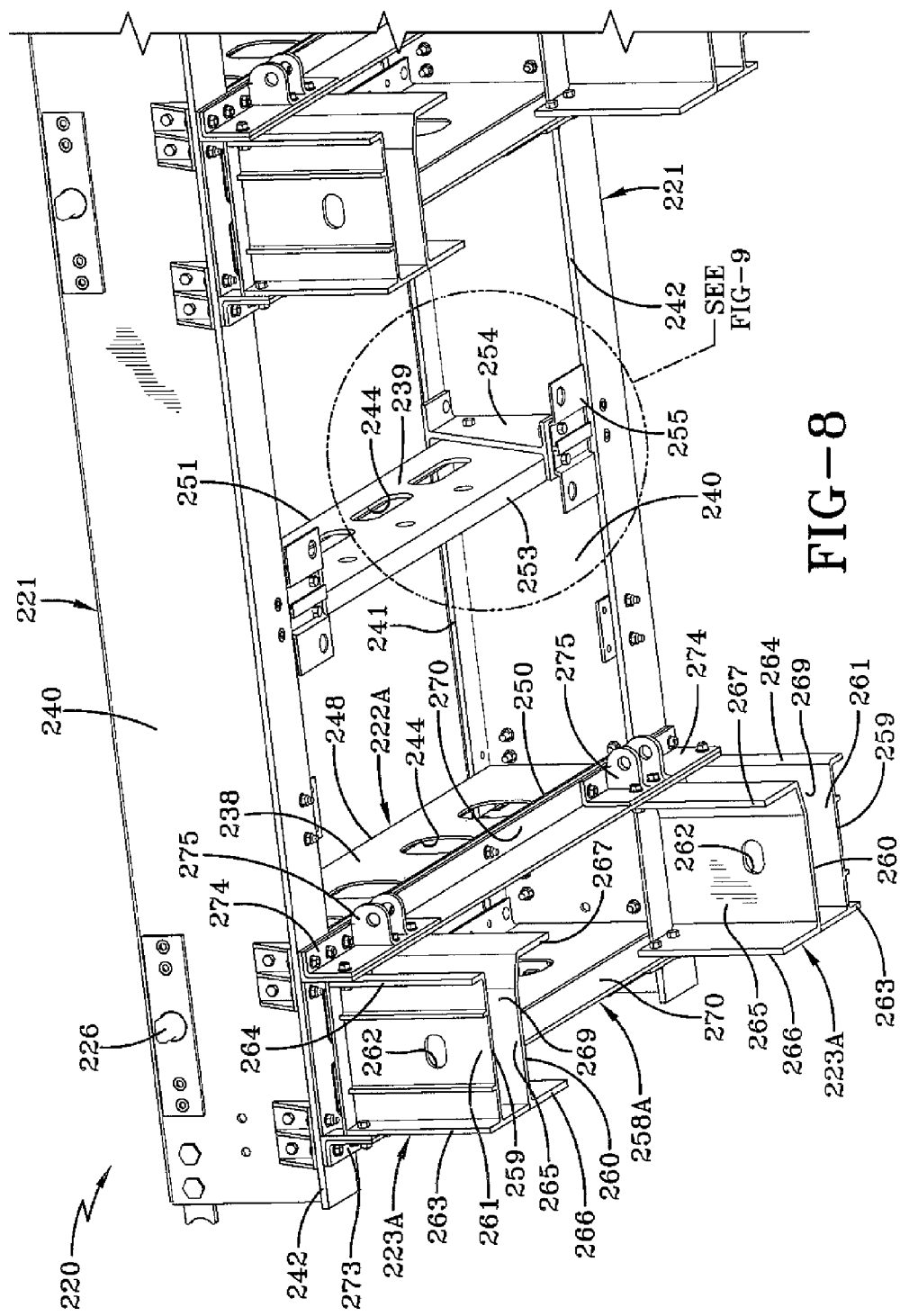
FIG. 8 is an enlarged bottom perspective view of a front portion of the slider box, force distribution assemblies and depending hangers shown in FIG. 4.
Figure 11:
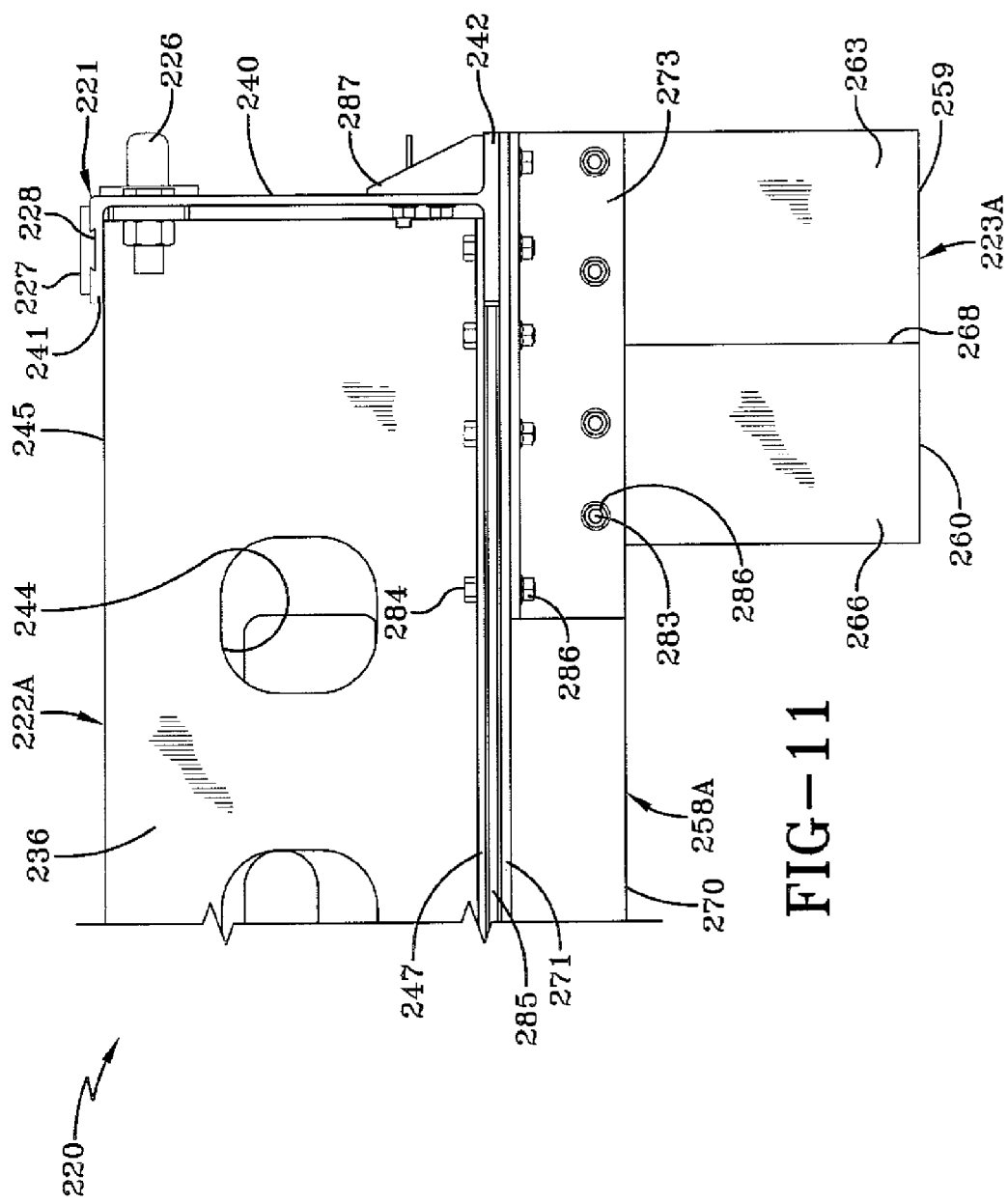
FIG. 11 is a greatly enlarged fragmentary elevational view, looking rearwardly, of a driver's side front portion of the slider box, force distribution assembly and depending hanger shown in FIG. 7.

As best shown in FIGS. 5, 7 and 11, each slider box main member 221 includes an upper flange 241, a lower flange 242, and a vertical wall 240 extending between the upper and lower flanges. Upper flange 241 preferably extends only inboardly relative to vertical wall 240, thereby providing robustness for main members 221 and an area on which components may be mounted, while also enabling smooth interaction of the outboard surface of the main member with trailer body rails 141 of the type shown in FIG. 2. Lower flange 242 preferably extends inboardly and outboardly relative to vertical wall 240, thereby providing additional robustness for main members 221, and a significant surface area for mounting components, as will be described below. Flanges 241, 242 and vertical wall 240 each are formed with bolt holes 243 to receive fasteners, as will also be described in greater detail below Extending between and interconnecting main members 221 are front and rear cross member sets 222A,B. Turning now to FIGS. 7 and 8 and referring to front cross member set 222A by way of example, each cross member set includes a front cross member 245, an intermediate cross member 248 and rear cross member 251.

Front cross member 245 includes an upper flange 246, a lower flange 247, and a vertical wall 236 extending between the upper and lower flanges. Upper flange 246 preferably extends rearwardly relative to vertical wall 236, while lower flange 247 preferably extends frontwardly relative to the vertical wall, thereby enabling convenient connection with main members 221 and force distribution assembly 258, as will be described below. Flanges 246, 247 each are formed with bolt holes 243 to receive fasteners. Vertical wall 236 is formed with openings 244 to reduce weight and to provide for passage of air and/or fluid conduits, electrical lines, and the like used in the operation of the tractor-trailer (not shown).

Intermediate cross member 248 includes an upper flange 249, a lower flange 250, and a vertical wall 238 extending between the upper and lower flanges. Upper flange 249 preferably extends frontwardly relative to vertical wall 238, while lower flange 250 preferably extends rearwardly relative to the vertical wall, thereby enabling convenient connection with main members 221 and force distribution assembly 258, as will be described below. Flanges 249, 250 each are formed with bolt holes 243 to receive fasteners. Vertical wall 238 is formed with openings 244 to reduce weight and to provide for passage of air and/or fluid conduits, electrical lines, and the like used in the operation of the tractor-trailer (not shown).

Each end of front and intermediate cross members 245, 248 preferably is connected to main members 221 by mechanical fasteners, such as bolts. More particularly, a selected one of bolt holes 243 formed in the driver's side of front cross member upper flange 246 aligns with a respective one of the bolt holes formed in driver's side main member upper flange 241, and a selected one of the bolt holes formed in the passenger side of the front cross member upper flange aligns with a respective one of the bolt holes formed in the passenger side main member upper flange, thereby enabling a bolt (not shown) to secure each end of front cross member 245 to its respective main member 221. Likewise, selected ones of bolt holes 243 formed in front cross member lower flange 247 align with respective selected bolt holes formed in the inboard-facing portion of main member lower flange 242, enabling a bolt to secure cross member 245 to each respective main member 221. Preferably, front cross member 245 is received between main member upper and lower flanges 241, 242, thereby enabling the main member to capture and secure a respective end of the front cross member. Intermediate cross member 248 is connected to each main member 221 in the same manner as front cross member 245, and is positioned rearwardly of and spaced from the front cross member along the main members. Front and intermediate cross members 245, 248 are vertically aligned with force distribution assembly 258 for efficient distribution of forces, as will be described in greater detail below.

Figure 9:
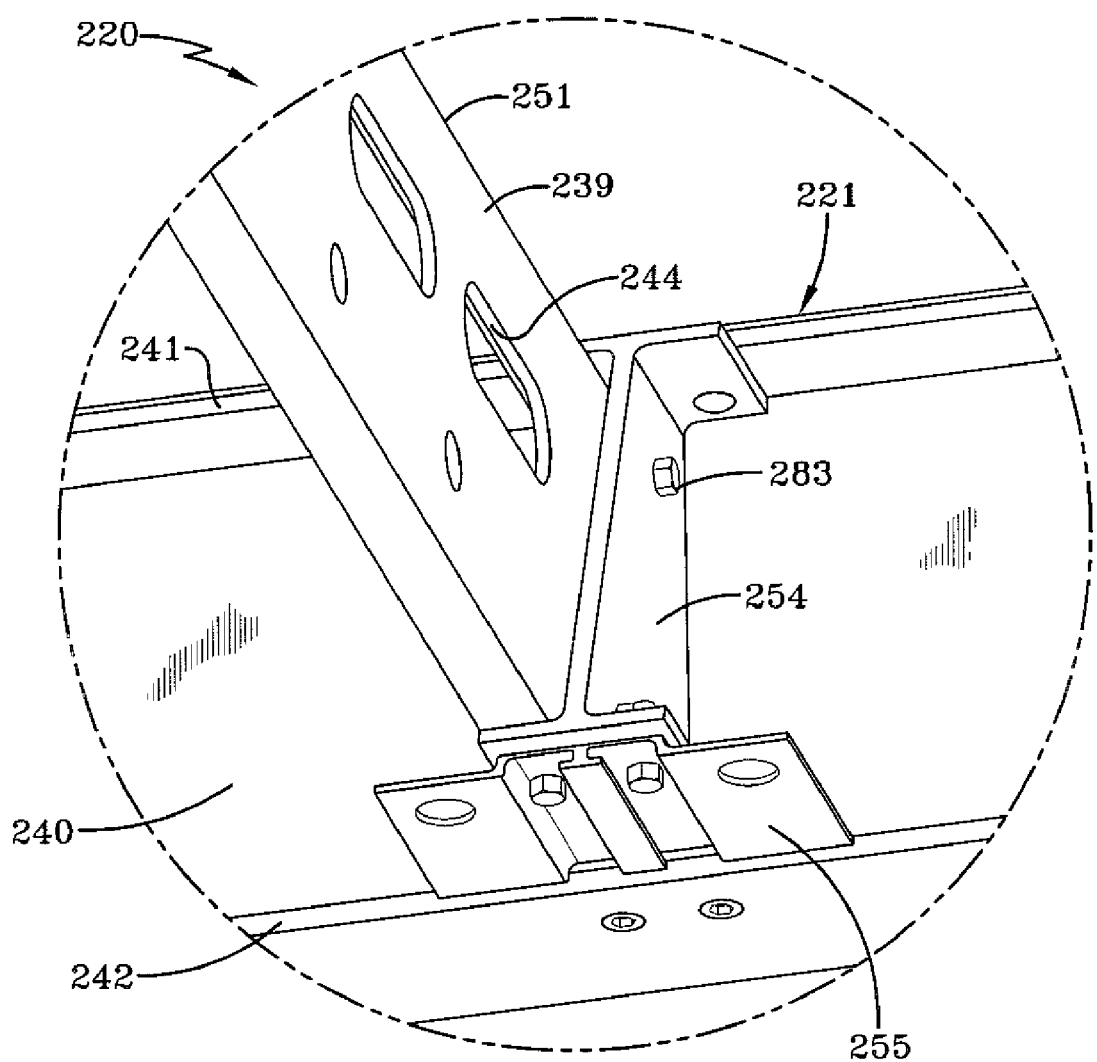
FIG. 9 is a greatly enlarged fragmentary bottom perspective view of the attachment area of a rear cross member to a main member of the slider box shown in FIG. 4.

Cross member set 222A also includes a rear cross member 251 to provide additional robustness for slider box 220. Rear cross member 251 includes an upper flange 252, a lower flange 253, and a vertical wall 239 extending between the upper and lower flanges Upper and lower flanges 252, 253 preferably extend frontwardly relative to vertical wall 239 and are formed with bolt holes 243 to receive fasteners. Vertical wall 239 is formed with bolt holes 243 to receive fasteners, and with openings 244 to reduce weight and to provide for passage of air and/or fluid conduits, electrical lines, and the like used in the operation of the tractor-trailer (not shown). With reference to FIG. 9, to enable attachment of rear cross member 251 to main member 221, the cross member connects to an adapter bracket 254, preferably via mechanical fasteners such as horizontally-disposed bolts 283. Adapter bracket 254 preferably is received between and bolted to main member upper and lower flanges 241, 242, thereby enabling the main member to capture and secure the adapter bracket, and in turn, rear cross member 251. To provide a mounting area for the top of air spring 233, and to provide reinforcement of rear cross member 251 and a secure fit for adapter bracket 254, an optional reinforcing plate 255 may be added between the adapter bracket and main member lower flange 242.

With reference to FIG. 6, slider box 220 optionally includes a reinforcement member 256, which extends between the rearwardmost ends of main members 221 to add additional strength and robustness to the structure. Reinforcement member 256 preferably is mechanically fastened to an adapter bracket 257, which in turn is received between and bolted to main member upper and lower flanges 241, 242.

As best shown in FIGS. 7 and 8 and referring to front hangers 223A by way of example, the hangers are attached to main members 221 and front and intermediate cross members 245, 248 by force distribution assembly 258, which will be described in greater detail below Each hanger 223A includes a flanged outboard member 259 and a flanged inboard member 260. Outboard member 259 includes front flanges 263, a rear flange 264, and a ribbed longitudinal wall 261 extending between the front and rear flanges. Longitudinal wall 261 has an opening 262 formed therein for receiving bushing assembly 232 (FIG. 5). Front flanges 263 extend inboardly and outboardly relative to longitudinal wall 261, and rear flange 264 extends only outboardly relative to the longitudinal wall. Inboard member 260 includes a front flange 266, a rear flange 267, and a generally longitudinal wall 265 extending between the front and rear flanges. Longitudinal wall 265 also includes opening 262 formed therein for receiving bushing assembly 232. Front and rear flanges 266, 267 both extend inboardly relative to longitudinal wall 265.

With additional reference to FIG. 11, outboard and inboard hanger members 259, 260, respectively, are assembled with the inboard-facing surface of outboard member front flange 263 in abutment with the outboard-facing surface of inboard member front flange 266, and the front flanges then are secured together via a vertical weld 268. Weld 268 is sufficient to join hanger outboard and inboard members 259, 260, since it experiences reduced in-service loading due to the efficient force distribution provided by force distribution assembly 258A, as will be described below. Optionally, rather than abutting and being welded together, front flange 263 of outboard hanger member 259 and front flange 266 of inboard hanger member 260 may form an overlap joint, which is secured by mechanical fasteners. When outboard and inboard hanger members 259, 260 are secured together, a channel 269 (FIG. 8) is formed for the receipt of beam 231 (FIG. 5) in hanger 223A, and the beam is pivotally secured to the hanger via bushing assembly 232 in a manner well-known in the art.

Figure 10:
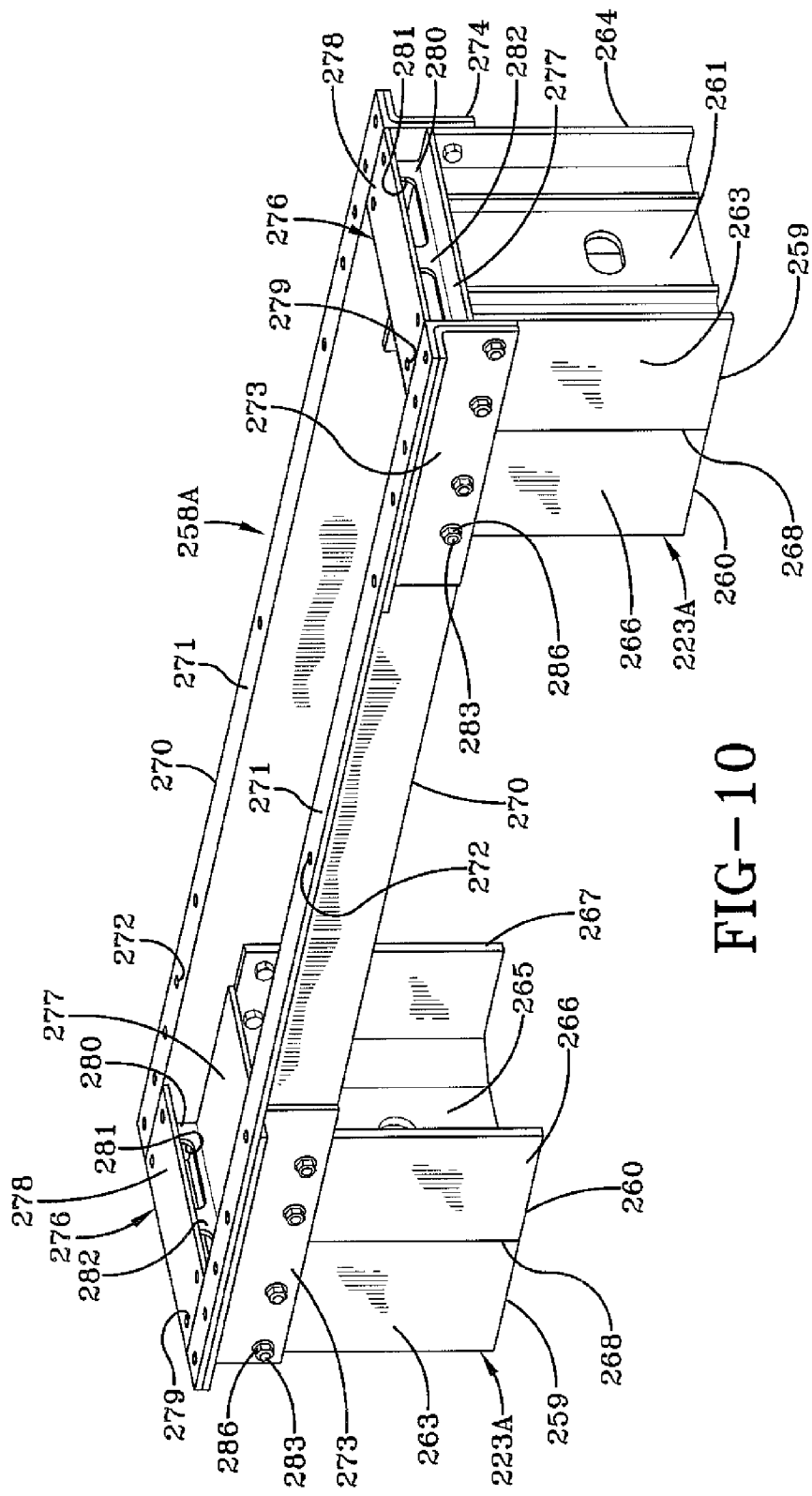
FIG. 10 is a perspective view of one of the force distribution assemblies shown in FIG. 4.

Turning now to FIG. 10, force distribution assembly 258A includes a pair of fore-aft spaced apart parallel, laterally-extending lower cross members 270. Lower cross members 270 preferably include a generally inverted L-shaped cross section and, as shown in FIGS. 5, 7 and 8, are disposed under slider box main members 221 and over hangers 223A, and preferably extend to the outboard edges of the slider box main members. More particularly, each lower cross member 270 includes an upper flange 271 which is disposed above hangers 223A and is formed with bolt holes 272 for mechanical attachment to the lower surface of main member lower flange 242 via vertically-disposed bolts 284 (FIG. 7). Each lower cross member 270 also is bolted via horizontally-disposed bolts 283 to an upper portion of respective ones of flanges 263, 266 and 264, 267 of hangers 223A In this manner, each lower cross member 270, by being disposed below main members 221 and generally above hangers 223A and extending transversely to the outboard edges of the main members, thereby interconnects the driver's side and passenger side hangers and main members. An optional front reinforcing member 273, which preferably includes an inverted L-shaped cross section, nests in front of and is secured to each end of front lower cross member 270 An optional rear reinforcing member 274, which also preferably includes an inverted L-shaped cross section, nests behind and is secured to each end of rear lower cross member 270 Front and rear reinforcing members 273, 274 provide additional robustness for force distribution assembly 258A and the rear reinforcing member preferably is formed with mounting projections 275 (FIG. 8) to enable the connection of shock absorbers 234.

Maintaining the parallel relationship between lower cross members 270, thereby forming a box-type structure, is a bottom plate 277 of an energy-absorbing component 276. More particularly, bottom plate 277 of energy-absorbing component 276 is disposed on the top surface of and is welded to outboard and inboard hanger members 259, 260. The forward-facing edge of plate 277 abuts the rearward-facing surface of front lower cross member 270, and the rearward-facing edge of the plate abuts the forward-facing surface of the rear lower cross member. The outboard edge of plate 277 vertically aligns with the outboard edges of hanger outboard flange member 259, and with the outboard edge of each lower cross member 270. In this manner, each bottom plate 277 cooperates with lower cross members 270 to form a rectangular structure about hangers 223A for the distribution of forces, as will be described below.

Energy-absorbing component 276 (FIG. 10) is a sacrificial component that deforms in an extreme event, as will also be described below. Energy-absorbing component 276 includes a top plate 278 that extends generally parallel to bottom plate 277. The upper surface of top plate 278 generally aligns with the upper surface of cross member upper flange 271, and includes bolt holes 279 for mechanical attachment to main members 221 via vertically-disposed bolts 284 (FIG. 7) Extending between bottom and top plates 278, 279 is a vertical web 280, which includes openings 281 and a rib 282 formed between the openings. As will be described in greater detail below, rib 282 deforms in an extreme event to reduce or eliminate damage to main members 221, cross member sets 222A,B, and other components.

With reference to FIG. 11, horizontally-disposed bolts 283 preferably are used to attach lower cross members 270 to hangers 223A,B and vertically-disposed bolts preferably are used to attach the lower cross members to main member lower flange 242. Front lower cross member 270 is aligned with and mechanically fastened to lower flange 247 of front cross member 245 (FIG. 5) with vertically-disposed bolts 284, while the rear lower cross member is aligned with and mechanically fastened to lower flange 250 of intermediate cross member 248 (FIG. 8), also with vertically-disposed bolts. A spacer plate 285 (FIG. 11) is disposed between lower cross members 270 and each respective front and intermediate cross member 245, 248 to maintain uniform spacing. Of course, horizontally-disposed and vertically-disposed bolts 283, 284 preferably are secured with nuts 286, as known in the art.

To provide additional reinforcement to main members 221, angle braces 287 optionally are bolted to and extend between the outboard portion of lower flange 242 and vertical wall 240 (FIG. 7). As shown in FIGS. 5 and 6, each main member 221 has a pair of rail guides 288 mounted on its outboard surface adjacent to a respective one of the ends of the main member. Additional components, such as a mechanical stop assembly 290 (FIG. 6) to reduce or prevent dock walk, as known in the art, may optionally be connected to main members 221 and/or other components of slider box 220.

First embodiment slider box 220 of the present invention provides a robust structure that is interconnected by mechanical fasteners, thereby reducing the potential for failure of welds in high-stress areas. Moreover, the use of force distribution assembly 258A,B under main members 221 enables forces encountered by axle/suspension system 230A,B to generally travel up each respective hanger 223A,B and across lower cross members 270, for distribution across to the opposing main member. In this manner, forces encountered by the system are distributed among main members 221, rather than being isolated in a single interface between a hanger and respective main member, as in many prior art systems.

More particularly, since lower cross members 270 are disposed below main members 221 and generally above hangers 223A,B, a reduction in the moment arm along which loading forces occur is achieved, thus reducing the forces that reach the main member above the respective hanger that is under load This reduction of the moment arm is due to lower cross members 270 channeling side loads laterally and vertically into a respective main member 221 that is opposite the load input. That is, in the prior art, loads are transmitted from the bushing assembly up through the continuous structure of a hanger that is welded to a respective main member. In contrast, lower cross members 270 interrupt the prior-art continuous structure and thereby interrupt the continuity of the load being transmitted up each hanger 223A,B to each respective main member 221, thereby reducing the moment arm along which the forces act, which in turn reduces the magnitude of the resultant forces. Since they are linked together, lower cross members 270 work to unify the fore-aft forces experienced by outboard hanger wall 261 and inboard hanger wall 265, and the side load forces experienced by hanger front flanges 263, 266 and rear flanges 264, 267. It should be noted that the reduction of the moment arm is desirably achieved without any change in height of the system. That is, the distance from bushing assembly 232 to each respective main member 221 remains the same, but the intervening structure of lower cross members 270 changes the load path and reroutes forces, thereby reducing the moment arm and distributing the loads up into the main members and cross member sets 222A,B to react the loads in an effective manner.

Through the use of force distribution assembly 258A,B, side loads and fore-aft loads are reacted by horizontally-disposed and vertically-disposed bolts 283, 284, while lesser shear forces are reacted by the welds between hangers 223A,B and bottom plate 277, which are sufficient for the task.

First embodiment slider box 220 of the present invention also provides a structure that reduces potential damage from extreme events First, lower cross members 270 of force distribution assembly 258A,B are designed to bend, but not break, in an extreme event such as a wheel impacting a guardrail post. The design of slider box 220 isolates any potential damage to an easily-repairable component, rather than other components such as main members 221 or cross member sets 222A,B. In order to prevent continued operation in a damaged state, thereby preventing further damage, lower cross members 270 optionally bend enough in an extreme event to move axle 237 into a noticeable misalignment, which alerts the vehicle operator that repairs must be made, while maintaining enough strength to keep the axle attached to slider box 220.

In addition, first embodiment slider box 220 includes the use of energy-absorbing component 276 to reduce potential damage from extreme events. Energy-absorbing component 276 includes rib 282, which absorbs the force of the impact from an extreme event and is designed to fail when it teaches its vertical force limit. By being mounted between each hanger 223A,B and its respective main member 221, energy-absorbing component 276 deflects the force under heavy fore-aft loads, side loads and/or vertical loads to protect main members 221, cross member sets 222A,B and other structural components from the stress caused by the force of the impact. After absorbing an impact, energy-absorbing component 276 can be replaced in a much more efficient and inexpensive manner than replacing main members 221 and cross member sets 222A,B. In most cases, little to no damage occurs to main members 221 or cross member sets 222A,B, since energy-absorbent component 276 absorbs the energy from the extreme impact and maintains the integrity of the main members and cross member sets.

In this manner, first embodiment slider box 220 provides a lighter weight heavy-duty vehicle subframe that includes components which are joined in a stronger and more dependable manner than by welding, efficiently distributes forces, and reduces potential damage from extreme events. It should be noted that most components of slider box 220, including main members 221, front cross members 245, intermediate cross members 248, rear cross members 251, reinforcing member 256, adapters 254 and 257, outboard hanger member 259, inboard hanger member 260, lower cross members 270 and energy-absorbing component 276, preferably are made from a light-weight material, such as aluminum or an aluminum alloy, and include a uniform cross section that enables the components to be extruded or pultruded and then saw cut. Extruding, or pultruding, and saw-cutting aluminum components enables first embodiment slider box 220 to be lighter in weight than prior art slider boxes and relatively economical to manufacture.

Figure 12:
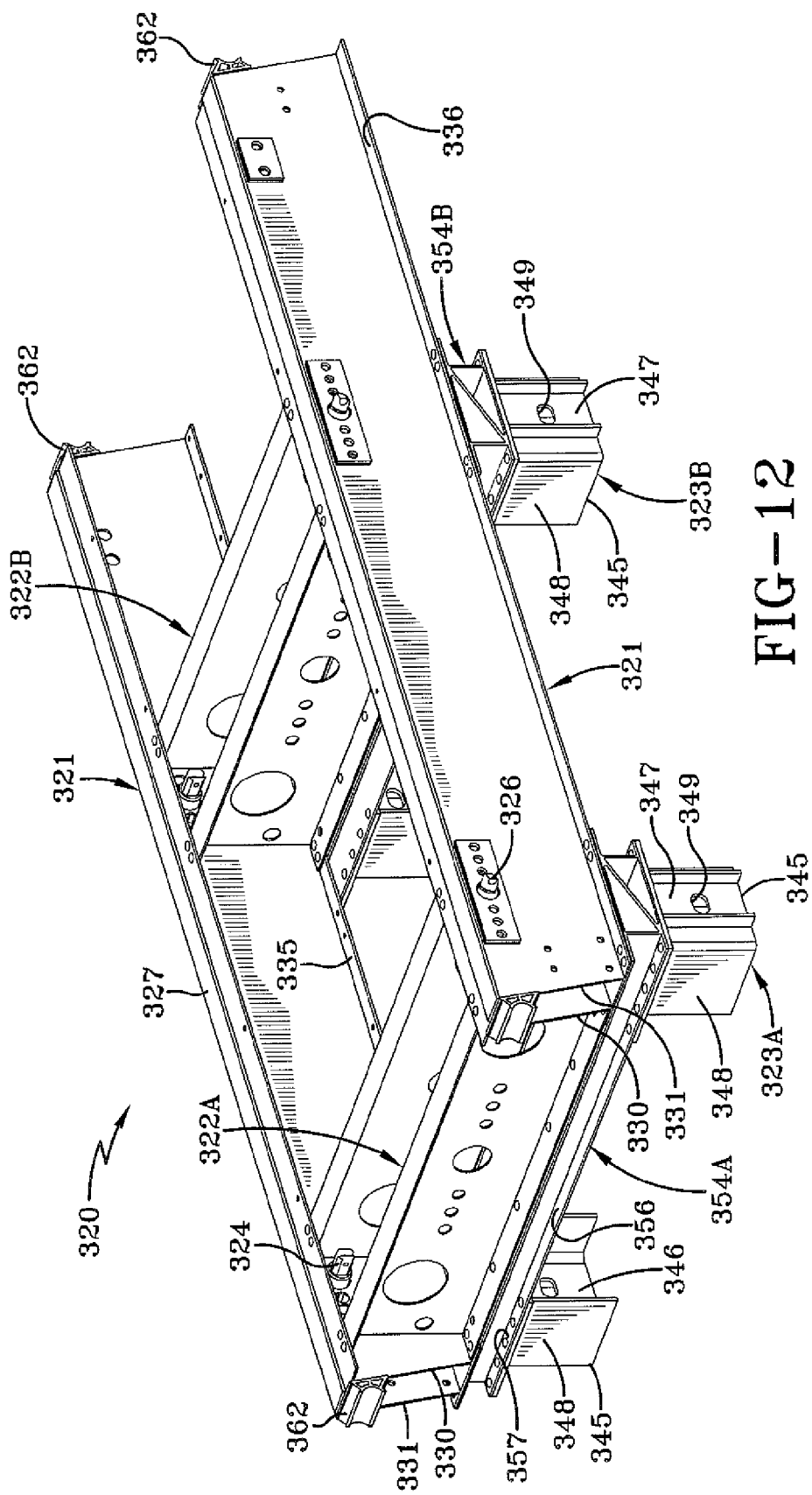
FIG. 12 is a top perspective view of a second embodiment slider box for a tractor-trailer of the present invention, showing force distribution assemblies and depending hangers.
Figure 13:
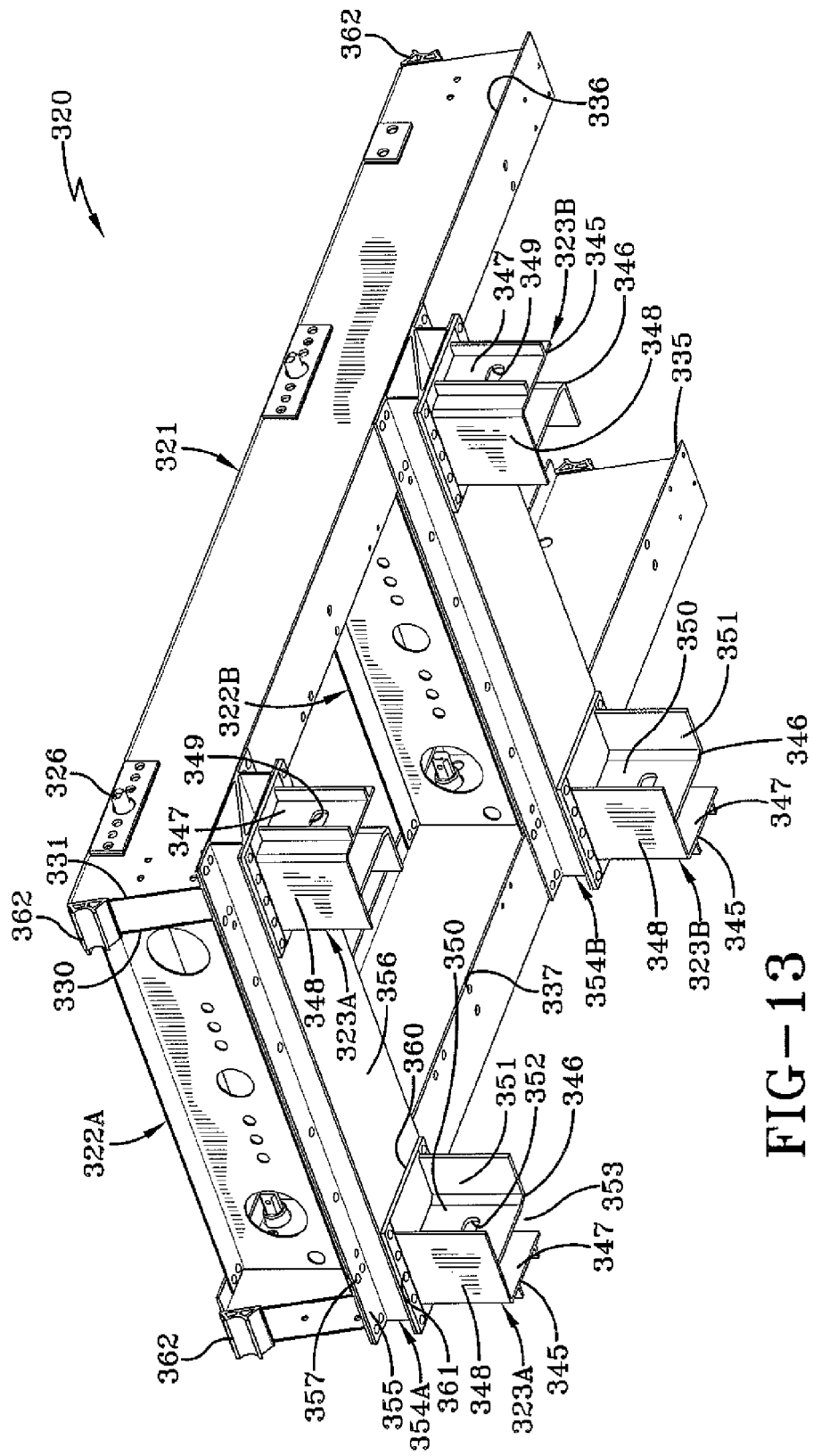
FIG. 13 is a bottom perspective view of the slider box, force distribution assemblies and depending hangers shown in FIG. 12.

Turning now to FIGS. 12-13, a second embodiment slider box of the present invention is shown and is indicated generally at 320. Second embodiment slider box 320 includes a pair of longitudinally extending, spaced-apart parallel main members 321, and transversely extending, parallel spaced front and rear cross member pairs 322A and 322B, which extend between and interconnect the main members. Second embodiment slider box 320 includes a front lower cross member or force distribution assembly 354A generally disposed under main members 321 and over front hangers 323A, and which preferably extends transversely to the outboard edges of the main members, as will be described in greater detail below. A rear lower cross member or force distribution assembly 354B is disposed under main members 321 and over rear hangers 323B, and preferably extends transversely to the outboard edges of the main members. As will be described below, main members 321 have a generally rectangular cross section, which increases the strength of the main members and their ability to distribute loading forces, thereby in turn increasing the strength of second embodiment slider box 320 over other slider box designs.

Second embodiment slider box 320 accommodates a retractable pin mechanism 324, of which pins 326 are shown for the purpose of illustration. Pin mechanism 324 may be any mechanically or pneumatically actuated mechanism known to those skilled in the art, including a mechanism similar to that as described above for prior art slider box 120 or first embodiment slider box 220. A low friction strip 327, which is formed of any suitable low function material, such as ultra-high molecular weight polyethylene, is attached to the uppermost surface of each main member 321 and extends generally the entire length of the main member. More particularly, a channel (not shown) preferably is formed in main members 321 and low friction strip 327 interlocks with the channel without the use of bolts or fasteners, or with a reduced number of bolts or fasteners, in a manner similar to that as described above for channel 228 and low friction strip 227 of first embodiment slider box 220 (FIG. 11).

Figure 14:
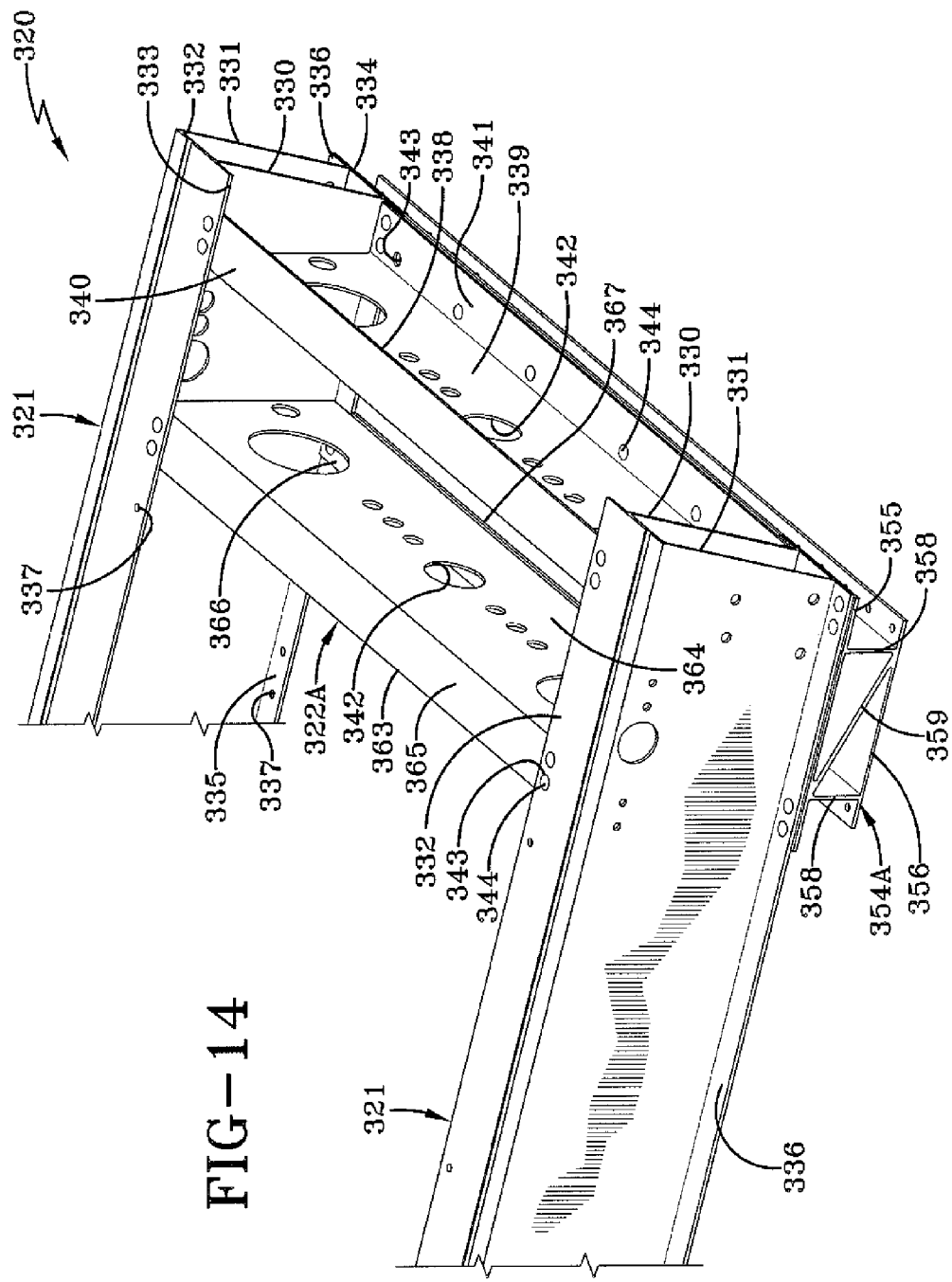
FIG. 14 is an enlarged fragmentary top perspective view of a front portion of the slider box and a force distribution assembly shown in FIG. 12.

Each main member 321 is a longitudinally-extending, elongated integrally-formed beam having a generally rectangular-shaped cross section preferably being made of a metal such as aluminum or an aluminum alloy. Main members 321 each include a pair of spaced-apart parallel inboard and outboard vertical sidewalls 330 and 331, respectively. With additional reference to FIG. 14, main members 321 each also include an upper horizontal wall 332 with an inboardly-extending flange 333, which provides robustness for the main members and an area on which components may be mounted, while also enabling smooth interaction of the outboard surface of the main member with trailer body rails 141 of the type shown in FIG. 2. Main members 321 each also include a lower horizontal wall 334 with an inboardly-extending flange 335 and an outboardly-extending flange 336, thereby providing additional robustness for the main members, and a significant surface area for mounting components. Flanges 333, 335, 336 each are formed with bolt holes 337 to receive fasteners, as will be described below.

Extending between and interconnecting main members 321 are front and rear cross member pairs 322A,B. Referring to front cross member pair 322A by way of example, each cross member pair includes a front cross member 338 and a rear cross member 363. Front cross member 338 includes an upper flange 340, a lower flange 341, and a vertical wall 339 extending between the upper and lower flanges. Upper and lower flanges 340, 341 preferably extend frontwardly relative to vertical wall 339, thereby enabling convenient connection with main members 321 and lower cross member 354A, as will be described below. Flanges 340, 341 each are formed with bolt holes 343 to receive fasteners 344. Vertical wall 339 is formed with openings 342 to reduce weight and to provide for passage of air and/or fluid conduits, electrical lines, and the like used in the operation of the tractor-trailer (not shown).

Rear cross member 363 includes an upper flange 365, a lower flange 366, and a vertical wall 364 extending between the upper and lower flanges. Upper and lower flanges 365, 366 preferably extend rearwardly relative to vertical wall 364, thereby enabling convenient connection with main members 321 and lower cross member 354A, as will be described below. Flanges 365, 366 each are formed with bolt holes 343 to receive fasteners 344. Vertical wall 364 is formed with openings 342 to reduce weight and to provide for passage of air and/or fluid conduits, electrical lines, and the like used in the operation of the tractor-trailer (not shown)

Each end of front and rear cross members 338, 363 preferably is connected to main members 321 by mechanical fasteners, such as bolts or rivets 344. More particularly, a selected one of bolt holes 343 formed in the driver's side of front cross member upper flange 340 aligns with a respective one of bolt holes 337 formed in driver's side main member upper inboard flange 335, and a selected one of the bolt holes formed in the passenger side of the front cross member upper flange aligns with a respective one of the bolt holes formed in the passenger side main member upper inboard flange, thereby enabling bolt 344 to secure each end of front cross member 338 to its respective main member 321. Likewise, selected ones of bolt holes 343 formed in front cross member lower flange 341 align with respective selected bolt holes 337 formed in main member inboard lower flange 335, enabling bolt 344 to secure cross member 338 to each respective main member 321 Preferably, front cross member 338 is received between main member inboard upper and lower flanges 333, 335, thereby enabling the main member to capture and secure a respective end of the front cross member Rear cross member 363 is connected to each main member 321 in the same manner as front cross member 338, and is positioned rearwardly of and spaced apart from the front cross member along the main members. Front and rear cross members 338, 363 are vertically aligned with lower cross member 354A for efficient distribution of forces, as will be described in greater detail below.

Referring to front hangers 323A by way of example, the hangers are attached to main members 321 and front and rear cross members 338, 363 by lower cross member or force distribution assembly 354A, which will be described in greater detail below. Each hanger 323A includes an outboard member 345 and an inboard member 346. Outboard member 345 includes a ribbed outboard wall 347 with an opening 349 formed therein for receiving bushing assembly 232 (FIG. 5), and a front wall 348, which extends inboardly relative to the outboard wall. Inboard member 346 includes an inboard wall 350 with an opening 352 formed therein for receiving bushing assembly 232, and a rear wall 351, which extends inboardly relative to the inboard wall. Outboard and inboard hanger members 345, 346 are arranged to form a channel 353 for receipt of beam 231 (FIG. 5) in hangers 323A, and the beam is pivotally secured to the hanger via bushing assembly 232, in a manner well-known in the art.

Each lower cross member 354A,B includes an upper horizontal plate 355, a lower horizontal plate 356 and a pair of parallel vertical walls 358 extending between the upper and lower plates, thereby forming a rectangular cross section. Adding to the structural stability of lower cross member 354A,B is a diagonally-extending internal rib 359. Upper plate 355 is formed with bolt holes 357 to enable mechanical attachment to the lower surface of main member lower flanges 335, 336, and to cross member lower flanges 341, 366. Preferably, hanger outboard and inboard members 345, 346 are welded to an adapter plate 360, which is a low-stress connection point at which a weld is sufficient. Adapter plate 360 is formed with bolt holes 361 that align with selective ones of bolt holes 357 formed in lower cross member lower plate 356, thereby enabling mechanical attachment of hangers 323A,B to the lower cross member lower plate. In this manner, each lower cross member 354A,B, by being disposed below main members 221 and generally above hangers 323A,B and extending transversely to the outboard edges of the main members, thereby interconnects the driver's side and passenger side hangers and main members. Preferably, a spacer plate 367 is disposed between each lower cross members 354A,B and each respective front and rear cross member 338, 363 to maintain uniform spacing In order to enable second embodiment slider box 320 to interface with other structures associated with the heavy-duty vehicle (not shown) as well as for other purposes, the front and rear open ends of each main member 321 preferably receive an end bracket 362

Second embodiment slider box 320 of the present invention provides a robust structure that is interconnected by mechanical fasteners, thereby reducing the potential for failure of welds in high-stress areas. Moreover, the use of lower cross member 354A,B under main members 321 enables forces encountered by axle/suspension system 230A,B (FIG.

5) to generally travel up each respective hanger 323A,B and across the lower cross member for distribution across to the opposing main member More particularly, the attachment of lower cross members 354A,B to respective hangers 323A,B below main members 321 interrupts the transmission of forces from bushing assembly 232 (FIG. 5) up the hangers to the interface between the hangers and the main members, thereby reducing the moment arm along which the loading forces act, which in turn reduces the magnitude of the resultant forces. In this manner, forces encountered by the system are distributed among main members 321 and cross members 338, 363, rather than being isolated in a single interface between a hanger and respective main member, as in many prior art systems Second embodiment slider box 320 of the present invention also provides a structure that reduces potential damage from extreme events. Lower cross member 354A,B may optionally be designed to include an energy-absorbing component, such as vertical walls 358 and/or rib 359, which absorbs the force of the impact from an extreme event and is designed to fail when it reaches its vertical force limit. By being mounted between each hanger 323A,B and its respective main member 321, each respective lower cross member 354A,B deflects the force under heavy fore-aft loads, side loads and/or vertical loads to protect main members 321, cross member pairs 322A,B and other structural components from the stress caused by the force of the impact. After absorbing an impact, lower cross member 354A,B can be replaced in a much more efficient and inexpensive manner than replacing main members 321 and cross member pairs 322A,B.

In this manner, second embodiment slider box 320 provides a lighter weight heavy-duty vehicle subframe that includes components which are joined in a stronger and more dependable manner than by welding, efficiently distributes forces, and reduces potential damage from extreme events. It should be noted that most components of slider box 320, including main members 321, front cross members 338, rear cross members 363, outboard hanger member 345, inboard hanger member 346 and lower cross members 354A,B, preferably are made from a light-weight material, such as aluminum or an aluminum alloy, and include a uniform cross section that enables the components to be extruded or pultruded and then saw cut. Extruding, or pultruding, and saw-cutting aluminum components enables second embodiment slider box 320 to be lighter in weight than prior art slider boxes and relatively economical to manufacture.

Figure 15:
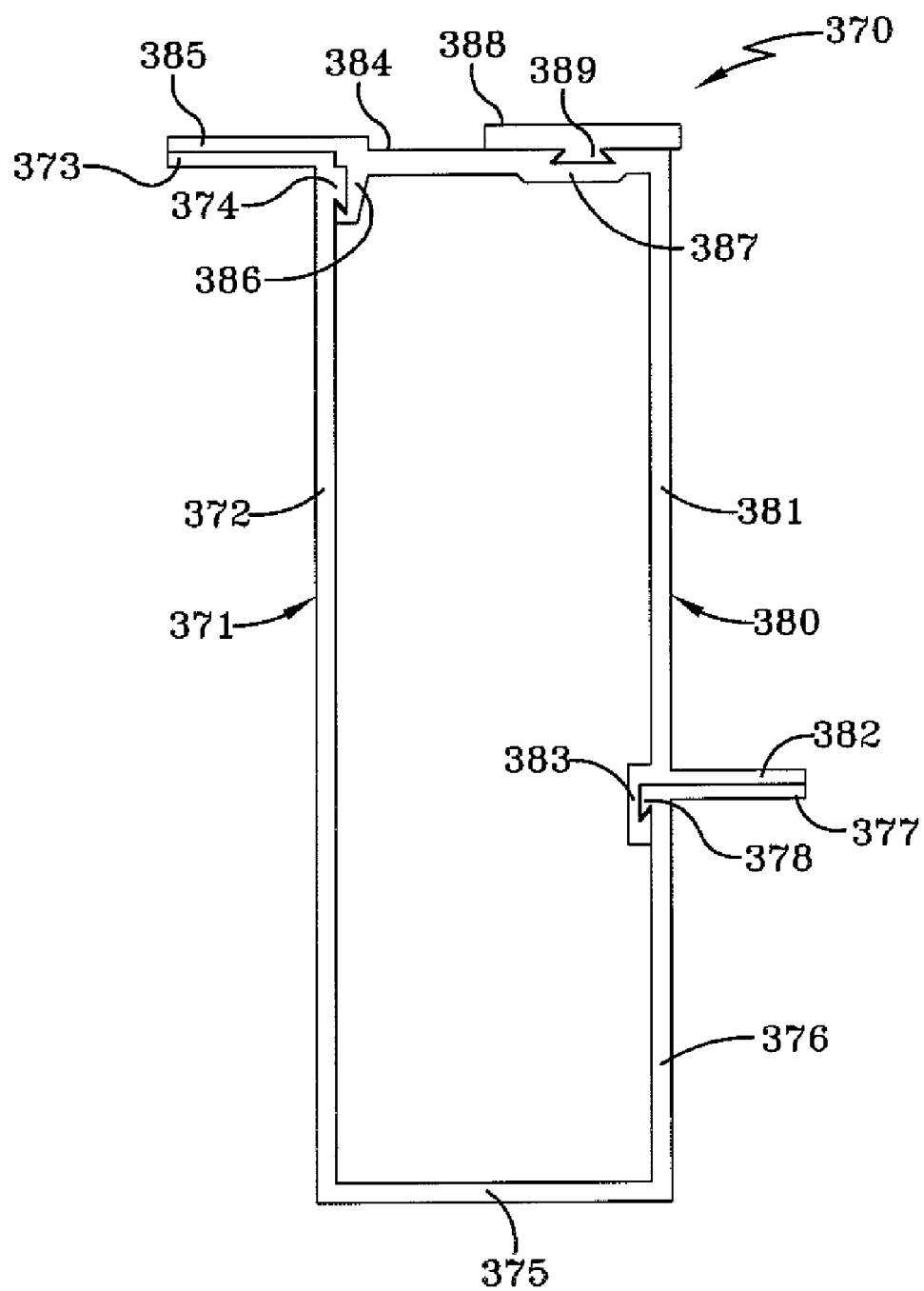
FIG. 15 is an elevational end view of a two-piece main member useful in the slider box shown in FIG. 12, with a low-friction pad.
Figure 16:
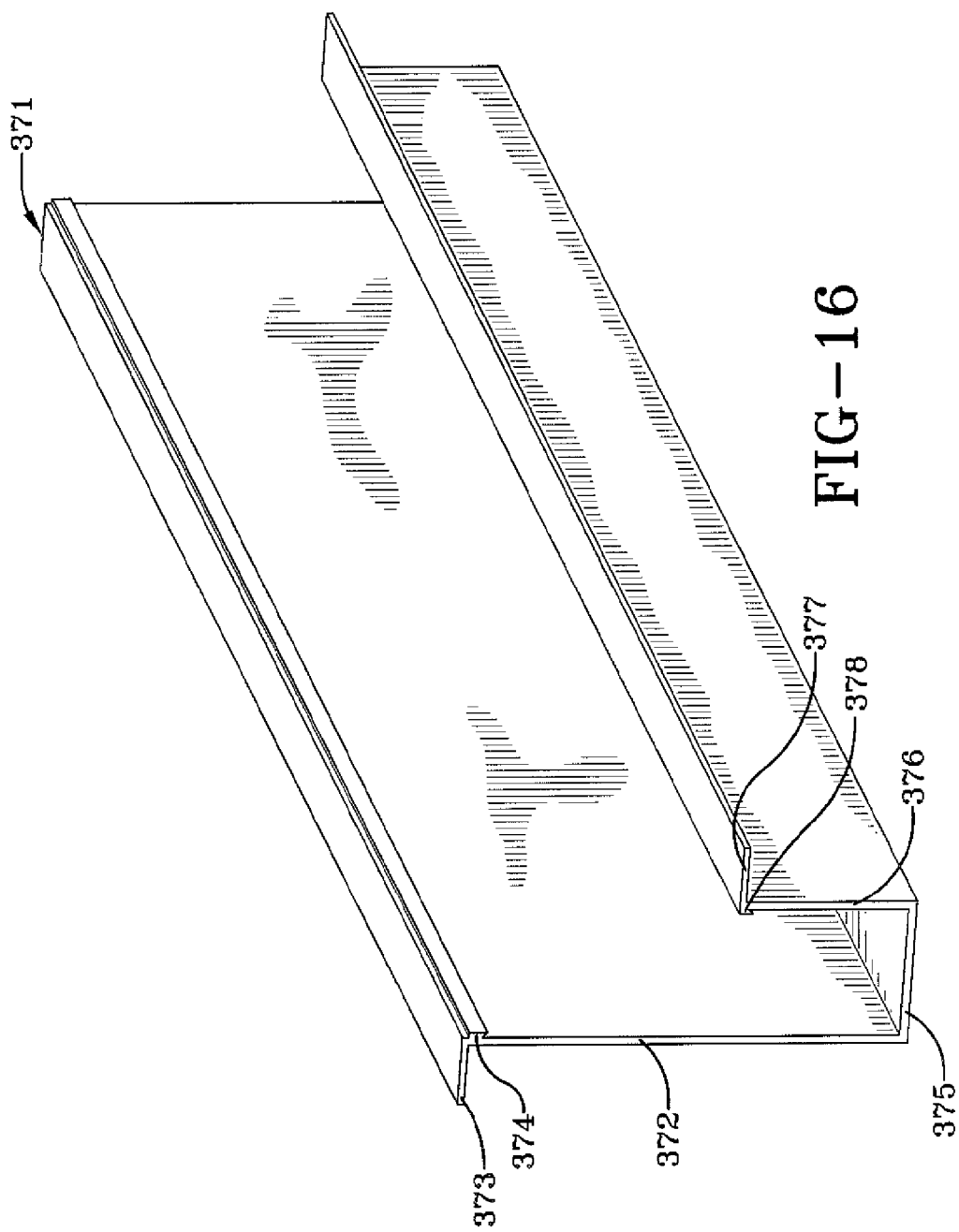
FIG. 16 is a top perspective view of an inboard half of the two-piece main member shown in FIG. 15.
Figure 17:
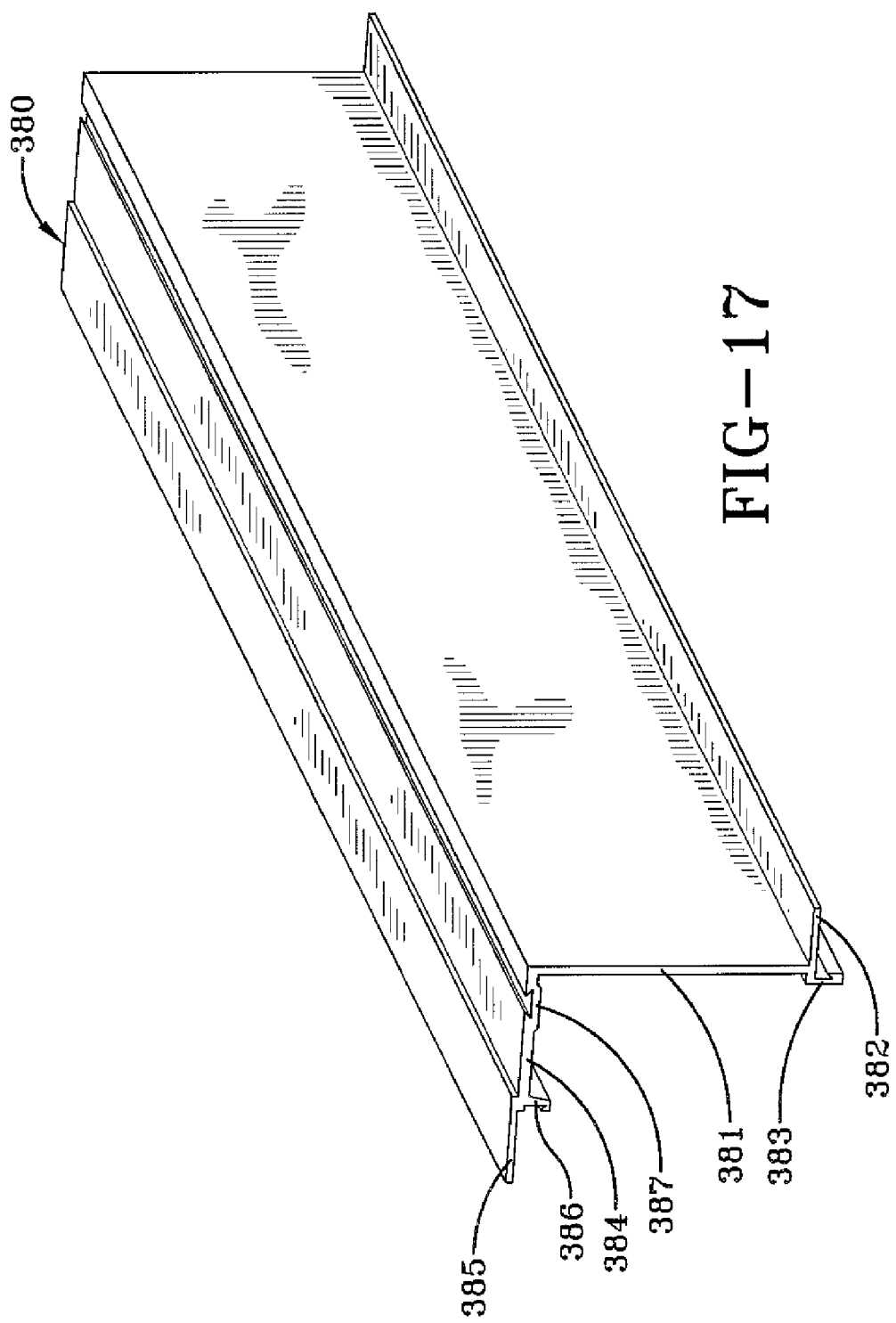
FIG. 17 is a top perspective view of an outboard half of the two-piece main member shown in FIG. 15.

It should be noted that, while each main member 321 of second embodiment slider box 320 is shown as a single unit having a rectangular cross section, the main members optionally may be of multiple pieces, such as two pieces. Turning to FIG. 15, an exemplary two-piece main member is indicated generally at 370. A disadvantage of some single-piece main members having a rectangular cross section is the lack of easy access to the interior of the main member to fasten components to the main member In addition, it typically is more expensive to form, such as through extrusion or pultrusion, a main member having a cross section with a closed or hollow interior than a main member having a cross section that is open. Two-piece main member 370 overcomes these disadvantages Two-piece main member 370 includes an inboard half 371 and an outboard half 380. With additional reference to FIG. 16, inboard half includes an inboard vertical wall 372 with a horizontal upper flange 373 extending inboardly therefrom. A male interlock member 374 is formed on an outboard-facing surface of inboard vertical wall 372 near upper flange 373. Inboard half 371 also includes an outboard partial wall 376, which extends generally parallel to inboard wall 372, and is connected to the inboard wall by a lower horizontal wall 375. At the top of partial outboard vertical wall 376, a horizontal flange 377 extends outboardly and a male interlock member 378 is formed on an inboard facing surface of the partial outboard wall near the horizontal flange With additional reference to FIG. 17, outboard half 380 of two-piece main member 370 includes a partial vertical outboard wall 381. At a bottom of partial outboard vertical wall 381, an interlock channel 383 is formed, which receives and mechanically interlocks with male interlock member 378 formed on partial outboard wall 376 of inboard half 371. Also at the bottom of partial outboard vertical wall 381, a horizontal flange 382 extends outboardly from the wall and rests on horizontal flange 377 which extends from partial vertical wall 376 of inboard half 371. Outboard half 380 further includes an upper horizontal wall 384, extending inboardly from the top of outboard partial vertical wall 381. Upper horizontal wall 384 includes an inboardly-extending flange 385 at its terminus, which rests on upper flange 373 of inboard vertical wall 372. Upper horizontal wall 384 also includes an interlock channel 386, which receives and mechanically interlocks with male interlock 374 formed on inboard vertical wall 372.

In this manner, inboard and outboard halves 371, 380 interlock with one another form an integral rectangular structure for main member 370. Two-piece main member 370 thus enables easy access for the attachment of components. There is easy access to all surfaces of each of inboard and outboard halves 371, 380, which enables components to be fastened onto the inboard and outboard halves. More particularly, it is generally easy to insert a bolt on one side of inboard or outboard halves 371, 380, and just as easy to tighten a mating nut on the other side of the respective inboard or outboard half. Once components are respectively attached to inboard and outboard halves 371, 380, the halves are then interlocked, creating an integral main member 370. Moreover, the constant cross-section and generally simple profile of inboard and outboard halves 371, 380 enable two-piece main member 370 to be economically formed via extrusion or pultrusion.

An additional feature of two-piece main member 370 is the ability to more easily form outboard half 380 with a channel 387 to retain a low friction strip 388. As mentioned above, in the prior art, as shown in FIG. 1, a low friction strip 127 is bolted to a main member 121 via fasteners 128. Since low friction strip 127 typically is made of a polymer such as ultrahigh molecular weight polyethylene, its thermal expansion is different from that of a metal main member 121. Over time, low friction strip 127 bulges between bolts 128, which may cause portions of the strip to break off, creating an unsupported area for the movement of slider box 120. Having such an unsupported area may contribute to cracking of certain components of slider box 120. In addition, the use of bolts 128 to secure strip 127 may result in a less-than-flush installation of some bolts, or a backing out of the bolts, which may undesirably cause slider box 120 to jam.

The use of channel 387 reduces or eliminates these prior art problems, and also reduces or eliminates the cost and weight of bolts 128. Channel 387 receives a corresponding interlocking member 389 formed on low friction strip 388, which interlocks with and thereby secures the strip to main member 370. In this manner, two-piece main member 370 secures low friction strip 388 without the use of bolts, or with a reduced number of bolts, and the use of channel 387 allows the strip to thermally expand at a different rate from that of main member 370 without bulging or breaking. Channel 387 is more easily and economically formed in the open cross section of outboard half 380 of two-piece main member 370, as compared to forming the channel in the closed, or hollow, cross section of single-piece main member 321.

Figure 18:
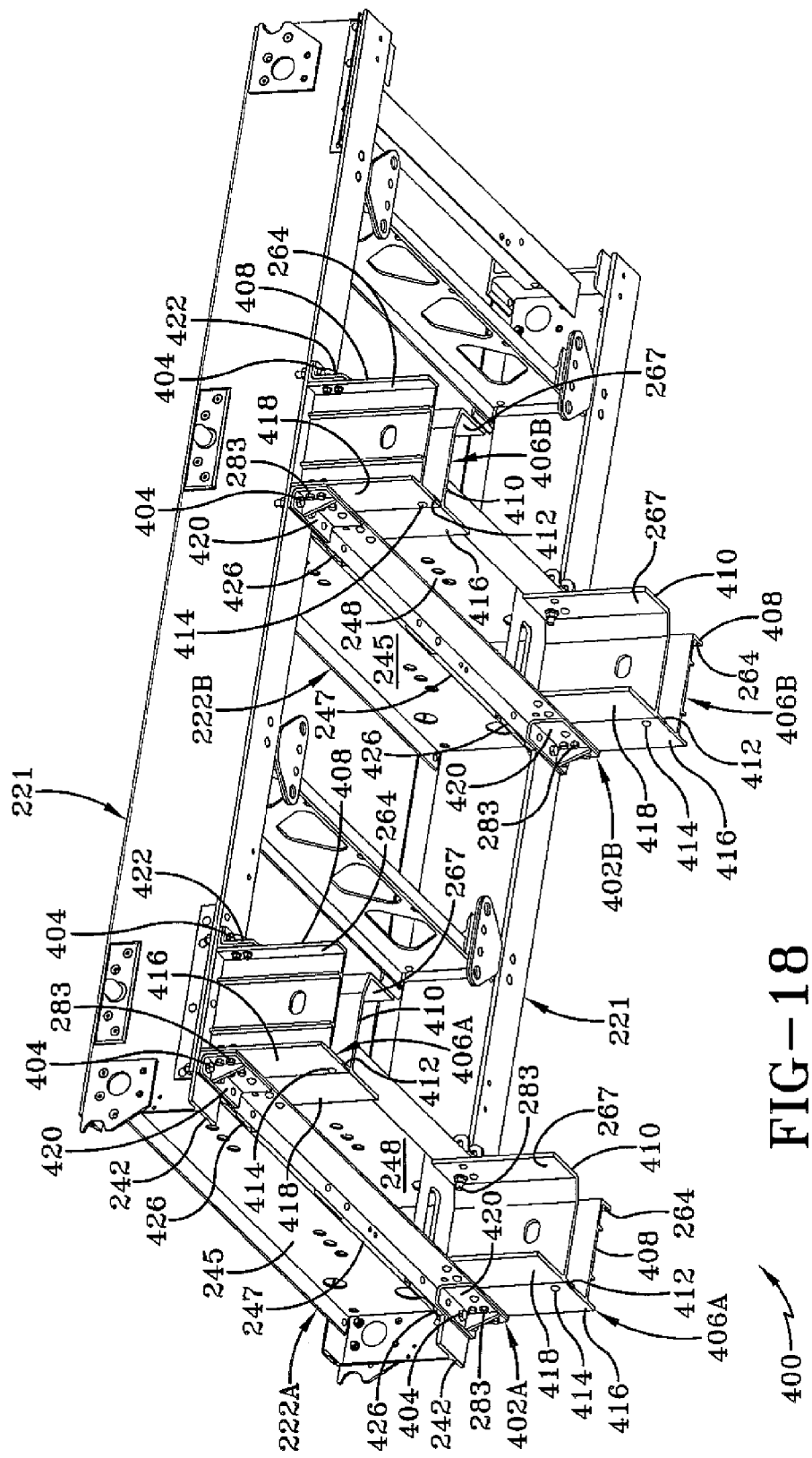
FIG. 18 is a bottom perspective view of a third embodiment slider box for a tractor-trailer of the present invention, showing force distribution assemblies and depending hangers.
Figure 19:
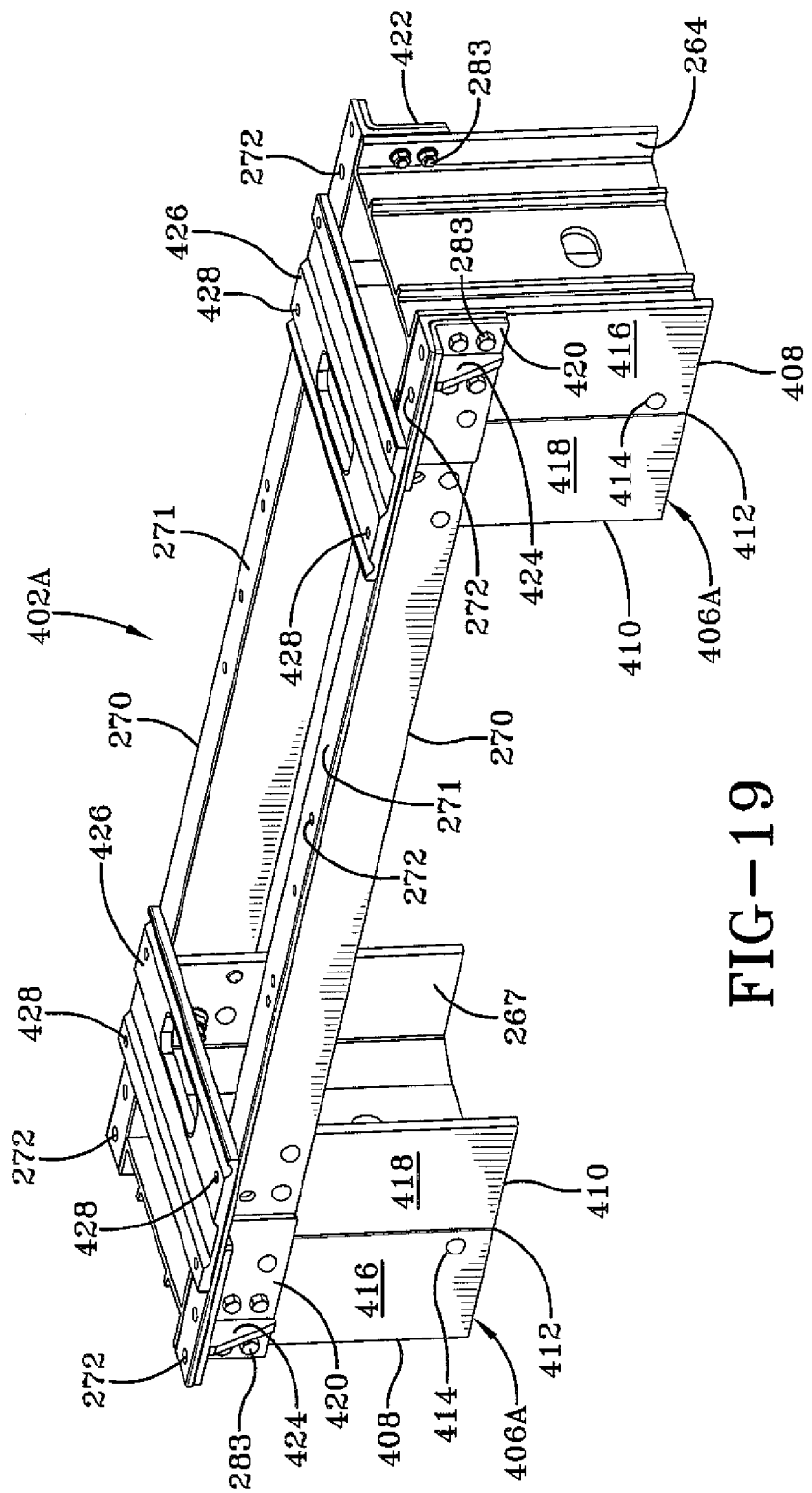
FIG. 19 is a perspective view of one of the force distribution assemblies shown in FIG. 18

Turning now to FIGS. 18-19, a third embodiment slider box for a heavy-duty vehicle of the present invention is shown and is indicated generally at 400. Third embodiment slider box 400 generally is the same in structure and operation as first embodiment slider box 220, with the exception that the third embodiment slider box employs front and rear force distribution assemblies 402A,B, respectively, having shearable bolts 404, rather than energy-absorbing component 276 of first embodiment front and rear force distribution assemblies 258A,B, respectively. As a result, the differences between third embodiment slider box 400 and first embodiment slider box 220 now will be described in detail.

With reference to FIG. 18, third embodiment slider box 400 includes longitudinally extending, spaced-apart parallel main members 221, and transversely extending, spaced-apart parallel front and rear cross member sets 222A and 222B, which extend between and interconnect the main members. Third embodiment slider box 400 includes a front force distribution assembly 402A generally disposed under main members 221 and over front hangers 406A, and which preferably extends transversely to the outboard edges of the main members. A rear force distribution assembly 402B similarly is generally disposed under main members 221 and over rear hangers 406B, and preferably extends transversely to the outboard edges of the main members.

Hangers 406A,B of third embodiment slider box 400 are generally the same in structure and operation as hangers 223A,B of first embodiment slider box 220, with the exception that each hanger is shown with outboard and inboard hanger members 408, 410, respectively, which are secured by an overlap joint 412 and a mechanical fastener 414, such as a bolt. More particularly, outboard hanger member 408 includes a front flange 416, and inboard hanger member 410 includes a front flange 418. Front flange 416 of outboard hanger member 408 and front flange 418 of inboard hanger member 410 form overlap joint 412 when the hanger members are assembled, and the overlap joint is secured by fastener 414, as known to those skilled in the art.

With additional reference now to FIG. 19, and referring to front force distribution assembly 402A by way of example, the force distribution assembly includes fore-aft spaced apart parallel, laterally-extending lower cross members 270. Each lower cross member 270 is disposed adjacent an upper portion of hangers 406A and includes, as in force distribution assembly 258A of first embodiment slider box 220, upper flange 271. Upper flange 271 is formed with bolt holes 272 for mechanical attachment to the lower surface of main member lower flange 242 via vertically-disposed shearable bolts 404 (FIG. 18). Each lower cross member 270 also is bolted via horizontally-disposed bolts 283 to an upper portion of respective ones of flanges 416, 418 and 264, 267 of hangers 406A.

An optional front reinforcing member 420, which is similar to front reinforcing member 273 of first embodiment slider box 220, nests in front of and is secured to each end of front lower cross member 270. An optional rear reinforcing member 422, which is similar to rear reinforcing member 274 of first embodiment slider box 220, nests behind and is secured to each end of rear lower cross member 270. Front and rear reinforcing members 420, 422 provide additional robustness for force distribution assembly 402A, and each preferably is formed with a rib 424 for additional structural support and to enable the connection of shock absorbers 234 (FIG. 5).

Maintaining the parallel relationship between lower cross members 270, thereby forming a box-type structure, are a pair of plates 426. More particularly, each one of plates 426 is disposed on the top surface of upper flange 271 of lower cross member 270, generally above hangers 406A, and inboardly of a respective one of main members 221. Each plate 426 includes openings 428 that align with openings 272 in upper flange 271 of lower cross member 270, and with a respective set of openings 243 formed in lower flange 247 of front cross member 245 (FIG. 7) or lower flange 250 of intermediate cross member 248 (FIG. 8). Aligned openings 272, 428 and 243 receive shearable bolts 404, which secure lower cross member 270 and plates 426 to front cross member 245 and to intermediate cross member 248, thereby forming a rectangular structure about hangers 406A for distribution of forces.

Third embodiment slider box 400 of the present invention provides a robust structure that is interconnected by mechanical fasteners, thereby reducing the potential for failure of welds in high-stress areas. Moreover, the use of force distribution assembly 402A,B under main members 221 enables forces encountered by axle/suspension system 230A,B (FIG. 5) to generally travel up each respective hanger 406A,B and across lower cross members 270 for distribution across to the opposing main member. More particularly, the attachment of lower cross members 270 of force distribution assembly 402A,B to respective hangers 406A,B below main members 221 interrupts the transmission of forces from bushing assembly 232 (FIG. 5) up the hangers to the interface between the hangers and the main members, thereby reducing the moment arm along which the loading forces act, which in turn reduces the magnitude of the resultant forces. In this manner, forces encountered by the system are distributed among main members 221 and cross members 245, 248, rather than being isolated in a single interface between a hanger and respective main member, as in many prior art systems.

Third embodiment slider box 400 of the present invention also provides a structure that reduces potential damage from extreme events. Shearable bolts 404, which connect force distribution assembly 402A,B to main members 221 and cross members 245, 248, shear or fail when they teach a generally predetermined limit. Thus, when an impact is created by an extreme event, bolts 404 shear or fail under heavy fore-aft loads, side loads and/or vertical loads, thereby protecting main members 221, cross member pairs 222A,B and other structural components from the stress caused by the force of the impact. After bolts 404 shear, force distribution assembly 402A,B and/or hangers 406A,B can be replaced in a much more efficient and inexpensive manner than replacing main members 221 and cross member pairs 222A,B.

In this manner, third embodiment slider box 400 provides a lighter weight heavy-duty vehicle subframe that includes components which are joined in a stronger and more dependable manner than by welding, efficiently distributes forces, and reduces potential damage from extreme events. It should be noted that most components of slider box 400, including main members 221, front cross members 245, intermediate cross members 248, rear cross members 251, outboard hanger member 408, inboard hanger member 410, lower cross members 270 and plates 426, preferably are made from a lightweight material, such as aluminum or an aluminum alloy, and include a uniform cross section that enables the components to be extruded or pultruded and then saw cut. Extruding, or pultruding, and saw-cutting aluminum components enables third embodiment slider box 400 to be lighter in weight than prior art slider boxes and relatively economical to manufacture.

As described above, first, second and third embodiments 220, 320, 400 of the slider box of the present invention provide a lighter weight, heavy-duty vehicle subframe that includes components which are joined in a stronger and more dependable manner than by welding, efficiently distributes forces, and reduces potential damage from extreme events. Of course, depending on design considerations, other cross-sectional configurations for the components of slider box 220, 320, 400, than those described above may be used without affecting the overall concept or operation of the invention, such as plates, I-beams, C-beams, angled beams, X-shaped beams, rounded tubes, and the like In addition, energy-absorbing component 276, 354A,B of first and second embodiments slider box 220, 320, respectively, may include different shapes and configurations than those shown and described above, such as a slanted plate, an X-shaped plate, a series of vertically-oriented walls, or any other crushable or sacrificial structure, and may include any suitable alignment or orientation, such as fore-aft, transverse, vertical, and/or angled, without affecting the overall concept or operation of the invention. Moreover, rather than using energy-absorbing component 276, 354A,B, a shearable structure, such as shearable bolts 404 of third embodiment slider box 400, may be used, and may include different shapes and configurations with any suitable alignment or orientation, as described above for energy-absorbing component 276, 354A, B. Furthermore, combinations of energy-absorbing components 276, 354A,B and/or shearable structures 404 may be used without affecting the overall concept or operation of the invention.

It is to be noted that the number and arrangement of components may be adjusted from that as described above to suit particular design requirements, without affecting the overall concept or operation of the invention. In addition, while reference above has been made to the attachment of force distribution assemblies 258A,B, 354A,B, 402A,B to main members 221, 321, hangers 223A,B, 323A,B, 406A,B and selected components of cross member sets 222A,B, 322A,B, the force distribution assemblies may be attached to the main members and the hangers without attachment to the cross members, without affecting the overall concept of the invention.

It is also to be noted that, while reference has been made to bolts as mechanical fasteners, other mechanical fasteners, such as rivets, pins, tabs and the like, as well as combinations thereof, may be used. Moreover, the use of such mechanical fasteners may be used in selective combination with welds, so as to use welded connections in certain lower-stress areas and mechanical fasteners in higher stress areas. Further selective combination may be made with other methods of joining components, such as adaptive braces or interlocking joints.

Preferred embodiments slider box 220, 320, 400 have been shown and described with reference to exemplary ancillary components, and other ancillary components may be used without affecting the overall concept or operation of the invention. For example, while a pneumatic retractable pin mechanism 224 has been described, other types of retractable pin mechanisms as known the art may be used.

It is important to note that reference hereinabove has been made to preferred embodiments slider box 220, 320, 400 with the understanding that such reference is by way of example, and the present invention applies to heavy-duty vehicle primary frames, movable subframes and non-movable subframes. In addition, it is understood that the present invention finds application in all types of heavy-duty vehicle primary frames, movable subframes and non-movable subframes known to those skilled in the art, without affecting the concept or operation of the invention. Moreover, the present invention applies to primary frames, movable subframes and non-movable subframes that are capable of being outfitted with one, two, three or more axle/suspension systems. Also, while the present invention has been described with reference to a particular type of axle/suspension system, it applies to any suspension system or axle/suspension system known to those skilled in the art.

It is to be further understood that, while reference above has been made to the use of metals such as aluminum or an aluminum alloy with the present invention, other materials may be used. For example, other nonferrous metals and alloys thereof may be used. In addition, the present invention may also find applicability in uses with steel and other ferrous metals, particularly when it is desired to reduce dependency on welding. Moreover, the present invention may be used with composite materials or dissimilar metals that are not readily weldable, in which case adhesives or mechanical fasteners may be used to bond or secure the components.

Accordingly, the improved frame for heavy-duty vehicles is simplified, provides an effective, safe, inexpensive, and efficient structure which achieves all the enumerated objectives, provides for eliminating difficulties encountered with prior art frames for heavy-duty vehicles, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved frame for heavy-duty vehicles is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A frame for a heavy-duty vehicle, said frame comprising:
   a pair of transversely spaced-apart, parallel, elongated and longitudinally extending main members;
   at least two cross members extending between and being attached to said main members;
   at least a pair of hangers, each one of said hangers being attached to a respective one of said main members for suspending an axle/suspension system from said frame; and
   a force distribution assembly directly attached to said main members and to said hangers, said force distribution assembly extending transversely between and perpendicular to said main members and said hangers, whereby said force distribution assembly interrupts the transmission of forces encountered by said axle/suspension system that move through each one of said hangers and into its respective main member, and redirects at least a portion of said forces across the force distribution assembly and into the other one of said main members, said force distribution assembly including at least one of a shearable member and a crushable component.

2. The frame for heavy-duty vehicles of claim 1, wherein said shearable member includes a bolt.

3. The frame for heavy-duty vehicles of claim 1, wherein said cross members are attached to said main members by mechanical fasteners.

4. The frame for heavy-duty vehicles of claim 1, wherein said force distribution assembly is attached to said main members and said hangers by mechanical fasteners.

5. The frame for heavy-duty vehicles of claim 1, further comprising a low friction strip that interlocks with said main members.

6. The frame for heavy-duty vehicles of claim 1, wherein each of said main members includes two interlocking halves which form a rectangular cross section for each one of the main members.

7. The frame for heavy-duty vehicles of claim 1., wherein said frame is a subframe.

8. The frame for heavy-duty vehicles of claim 1, wherein said frame is a primary frame.

9. The frame for heavy-duty vehicles of claim 1, wherein at least one of said main members, said cross members, said hangers and said force distribution assembly is formed of aluminum.

10. The frame for heavy-duty vehicles of claim 1, wherein said force distribution assembly is disposed generally between said main members and said hangers.

11. The frame for heavy-duty vehicles of claim 1, wherein each one of said hangers depends from a respective one of said main members.

12. The frame for heavy-duty vehicles of claim 1, wherein said force distribution assembly is attached to at least one of said cross members.

13. A frame for a heavy-duty vehicle, said frame comprising:
   a pair of spaced-apart, parallel, elongated and longitudinally extending main members, each one of said main members including two interlocking halves which form a rectangular cross section for each one of the main members;
   at least two cross members extending between and being attached to said main members;
   at least a pair of hangers, each one of said hangers being attached to a respective one of said main members for suspending an axle/suspension system from said frame; and
   a force distribution assembly attached to said main members and to said hangers, said force distribution assembly extending perpendicularly between said main members and said hangers, whereby said force distribution assembly interrupts the transmission of forces encountered by said axle/suspension system that move through each one of said hangers and into its respective main member, and redirects at least a portion of said forces across the force distribution assembly and into the other one of said main members, said force distribution assembly including at least one of a shearable member and an energy-absorbing component.

14. A frame for a heavy-duty vehicle, said frame comprising:
   a pair of transversely spaced-apart, parallel, elongated and longitudinally extending main members;
   at least two cross members extending between and being attached to said main members;
   at least a pair of hangers, each one of said hangers being attached to a respective one of said main members for suspending an axle/suspension system from said frame; and
   a force distribution assembly attached to said main members and to said hangers, said force distribution assembly extending transversely between and perpendicular to said main members and said hangers, whereby said force distribution assembly interrupts the transmission of forces encountered by said axle/suspension system that move through each one of said hangers and into its respective main member, and redirects at least a portion of said forces across the force distribution assembly and into the other one of said main members, said force distribution assembly including at least one of a shearable member and a crushable component.

* * * * *